US009052762B2

(12) United States Patent
   Ozawa

(10) Patent No.: US 9,052,762 B2
(45) Date of Patent: Jun. 9, 2015

(54) IMAGE DISPLAY UNIT, IMAGE DISPLAY METHOD AND COMPUTER READABLE STORAGE MEDIUM THAT STORES IMAGE DISPLAY PROGRAM

(71) Applicant: CASIO COMPUTER CO., LTD., Shibuya-ku, Tokyo (JP)

(72) Inventor: Takeo Ozawa, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 188 days.

(21) Appl. No.: 13/779,674

(22) Filed: Feb. 27, 2013

(65) Prior Publication Data

US 2013/0222307 A1    Aug. 29, 2013

(30) Foreign Application Priority Data

Feb. 27, 2012   (JP) ................. 2012-039900

(51) Int. Cl.
   *G06F 3/041*   (2006.01)
   *G06F 3/0485*   (2013.01)
   (Continued)

(52) U.S. Cl.
   CPC .............. *G06F 3/041* (2013.01); *G06F 3/0485* (2013.01); *G06F 2203/04808* (2013.01); *G06F 3/04883* (2013.01); *H04N 1/00* (2013.01)

(58) Field of Classification Search
   CPC ....... G06F 3/041; G06F 3/048; G06F 3/0481; G06F 3/0484; G06F 3/01; G06F 3/0412
   USPC .......... 345/156–179; 715/810, 815, 817, 830, 715/831, 835
   See application file for complete search history.

(56) References Cited

U.S. PATENT DOCUMENTS

| 8,547,759 B2 | 10/2013 | Kadowaki |
| 2007/0177804 A1 | 8/2007 | Elias et al. |

(Continued)

FOREIGN PATENT DOCUMENTS

| JP | 2005-092386 A | 4/2005 |
| JP | 2005-318258 A | 11/2005 |

(Continued)

OTHER PUBLICATIONS

Japanese Office Action dated Dec. 19, 2013 (and English translation thereof) in counterpart Japanese Application No. 2012-039900.

*Primary Examiner* — Regina Liang
(74) *Attorney, Agent, or Firm* — Holtz, Holtz, Goodman & Chick PC

(57) ABSTRACT

An image display unit is provided which includes an input module receiving touch inputs, a display module displaying an image thereon, a touched state detection module detecting a touch input made onto the input module, a touched position acquiring module acquiring a touched position of the touch input, a flick detection module detecting whether the touch input is made by a flick operation, a flick direction detection module detecting a direction of the flick operation, and a display screen changing module executing either of a first display screen changing process of increasing the number of images displayed on the display module and contracting images displayed on the display module and a second display screen changing process of decreasing the number of images displayed on the display module and expanding images displayed on the display module based on the direction of the flick operation.

8 Claims, 15 Drawing Sheets

(51) Int. Cl.
  *G06F 3/0488* (2013.01)
  *H04N 1/00* (2006.01)

(56) References Cited

U.S. PATENT DOCUMENTS

| | | |
|---|---|---|
| 2010/0125786 A1 | 5/2010 | Ozawa et al. |
| 2010/0192099 A1 | 7/2010 | Takagi |
| 2011/0074824 A1 | 3/2011 | Srinivasan et al. |
| 2011/0154196 A1 | 6/2011 | Icho et al. |
| 2011/0175830 A1 | 7/2011 | Miyazawa et al. |
| 2011/0316884 A1 | 12/2011 | Giambalvo et al. |
| 2013/0117698 A1* | 5/2013 | Park et al. .................. 715/765 |

FOREIGN PATENT DOCUMENTS

| | | |
|---|---|---|
| JP | 2009-525538 A | 7/2009 |
| JP | 2010-124181 A | 6/2010 |
| JP | 2010-175738 A | 8/2010 |
| JP | 2011-043894 A | 3/2011 |
| JP | 2011-150412 A | 8/2011 |
| JP | 2012-038399 A | 2/2012 |
| JP | 2012037974 A | 2/2012 |
| WO | WO 2007/089766 A2 | 8/2007 |
| WO | WO 2010/087203 A1 | 8/2010 |
| WO | WO 2011/041112 A2 | 4/2011 |
| WO | WO 2011/163427 A2 | 12/2011 |

* cited by examiner

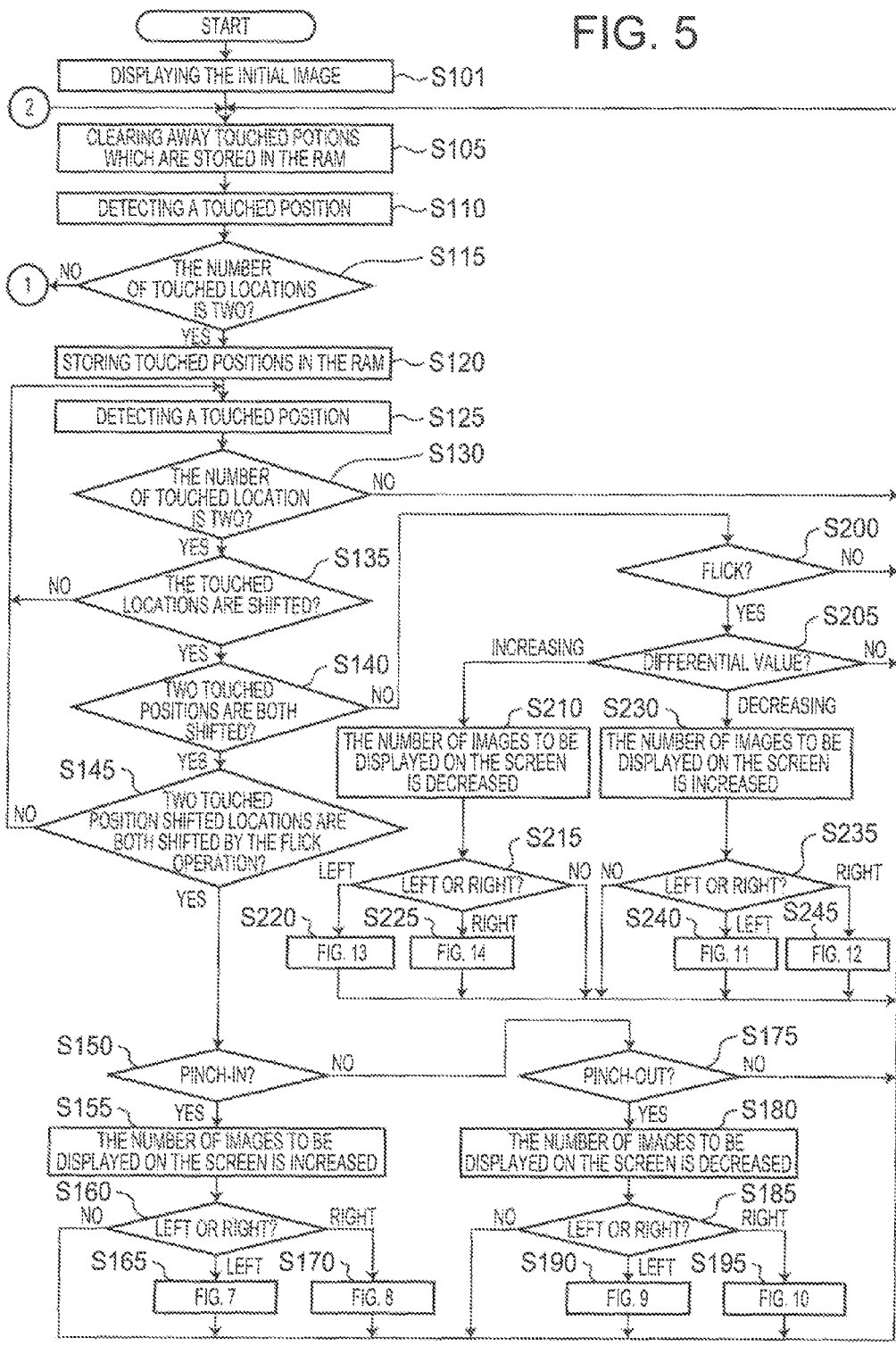

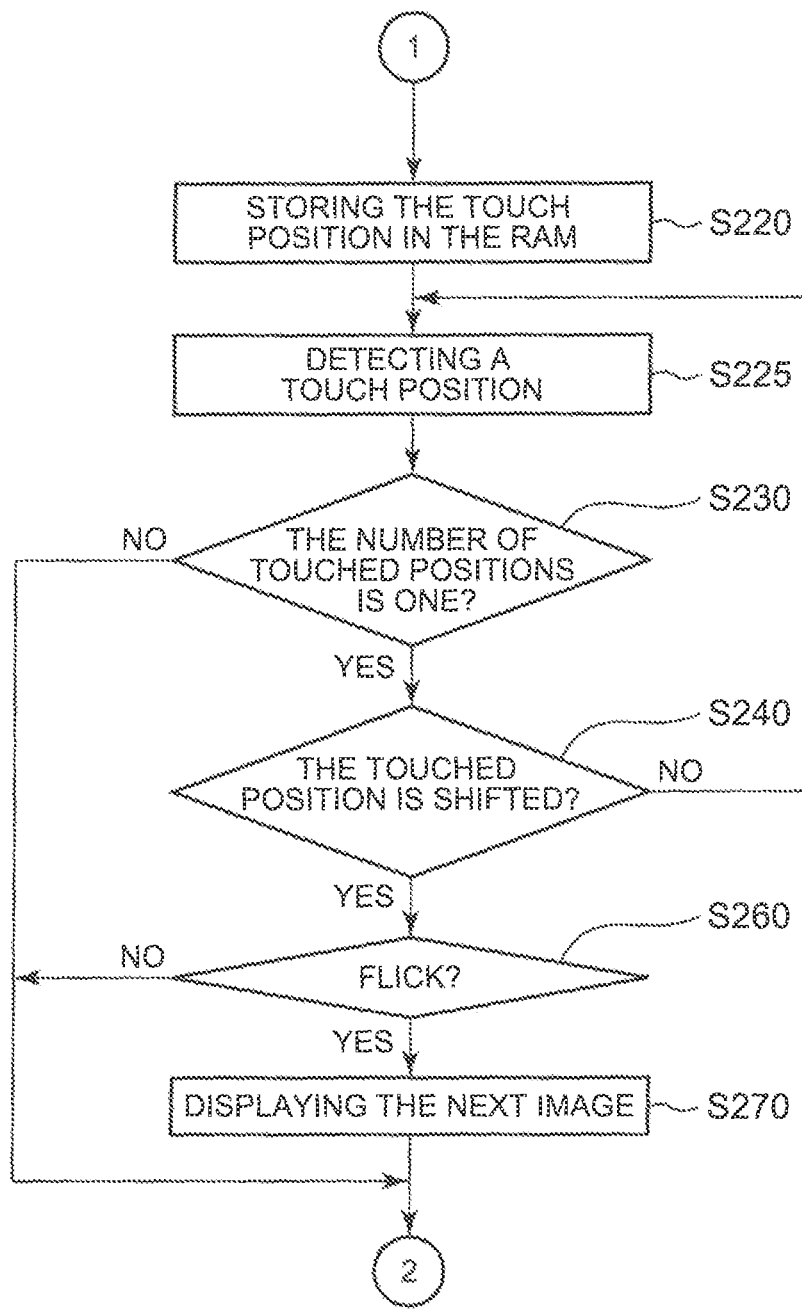

- MULTI-TAP MODE : LEFT PINCH-IN
- SINGLE-TAP MODE: LEFT DOWNWARD FLICK

- MULTI-TAP MODE : LEFT PINCH-OUT
- SINGLE-TAP MODE : LEFT UPWARD FLICK

- MULTI-TAP MODE : RIGHT PINCH-OUT
- SINGLE-TAP MODE : RIGHT UPWARD FLICK

- MULTI-TAP MODE : ONE IS FIXED AT A LEFT SIDE
  THE OTHER IS A LEFT FLICK
- SINGLE-TAP MODE : NOTHING

- MULTI-TAP MODE : ONE IS FIXED AT A RIGHT SIDE
                   THE OTHER IS A RIGHT FLICK
- SINGLE-TAP MODE : NOTHING

- MULTI-TAP MODE : ONE IS FIXED AT A RIGHT SIDE
  THE OTHER IS A LEFT FLICK
- SINGLE-TAP MODE : NOTHING

- MULTI-TAP MODE : ONE IS FIXED AT A LEFT SIDE
              THE OTHER IS A RIGHT FLICK
- SINGLE-TAP MODE : NOTHING

IMAGE DISPLAY UNIT, IMAGE DISPLAY METHOD AND COMPUTER READABLE STORAGE MEDIUM THAT STORES IMAGE DISPLAY PROGRAM

CROSS-REFERENCE TO RELATED APPLICATION

This application is based upon and claims the benefit of priority from the prior Japanese Patent Application No. 2012-39900 filed on Feb. 27, 2012, the entire contents of which are incorporated herein by reference.

BACKGROUND OF THE INVENTION

1. Field of the Invention

The present invention relates to an image display unit, an image display method and a computer readable storage medium that stores an image display program.

2. Description of the Related Art

In recent years, small printers for domestic use have been propagated widely which can print addresses, statements and images such as pictures on post cards. By using these small printers, it has become possible to print domestically addresses, statements and images such as pictures on new year's post cards or post cards sent to friends or the like to offer best wishes for their health in a hot season In those small printers, there are some which have a function to edit a number of images captured from a portable storage medium such as a memory card without involvement of a personal computer.

With the printer having the edit function, it is possible to easily print, for example, pictures taken by a digital still camera (DSC) directly from this printer without involvement of a personal computer, and therefore, the printer is very useful to those who have no personal computer. In addition, in the event that image data stored within the DSC or image data of an external storage medium is once stored in the printer, since it is possible that desired image data is selected to be printed, the printer is also useful in this respect.

In addition, for example, JP-T-2009-525538 (the term "JP-T" as used herein means a published Japanese translation of a PCT patent application) discloses an electronic system having a user interface which corresponds to a plurality of touch and release operations by gesturing using a multipoint sensing unit. Additionally, JP-A-2011-43894 (Japanese Unexamined Patent Application No. 2011-43894) discloses a printer that has a display module and a voice guidance module and which can facilitate the easy selection of photographic images or the like for printing.

The electronic system of JP-T-2009-525538 has been effective in performing operations on a touch panel screen of a mobile phone or a personal computer such as an operation of expanding or contracting a page of an electronic book or turning a page of the electronic book to change display screens by using, for example, two fingers, which are operation elements, to perform a pinch-in or pinch-out operation or a single finger to perform a swipe operation by causing the finger to slide on the screen.

In addition, in the printer disclosed in JP-A-2011-43894, the voice guidance is used in place of actual operations on a touch panel screen, and the voice guidance is used to guide the menu or an operation to be performed for the next operation. However, with the electronic system and the printer, it has not been possible to select from a number of photographic images a desired one or ones in an efficient and speedy fashion.

BRIEF SUMMARY OF THE INVENTION

The invention has been made in view of these situations and an object thereof is to solve the problem inherent in the related art.

According to a first aspect of the invention, there is provided an image display unit including an input module having an operation screen which receives touch inputs, a display module configured to display an image thereon, a touched state detection module configured to detect whether or not the operation screen of the input module is touched for a touch input, a touched position acquiring module configured to acquire a touched position on the input module which is touched for the touch input, a flick detection module configured to detect whether or not a flick operation is performed based on a time variation of the touched position, a flick direction detection module configured to detect a direction of the flick operation, and a display screen changing module configured to execute one of a first display screen changing process in which the number of images to be displayed on the display module is increased and the sizes of the images to be displayed on the display module are contracted to be displayed on the display module and a second display screen changing process in which the number of images to be displayed on the display module is decreased and the sizes of the images to be displayed on the display module are expanded based on the direction of the flick operation.

According to a second aspect of the invention, there is provided an image display method in an image display unit including an input module having an operation screen which receives a touch input and a display module configured to display an image thereon, the image display method executing a touched state detection process of detecting whether or not the operation screen of the input module is being touched for a touch input, a touched position acquiring process of acquiring a touched position on the input module which is touched for the touch input, a flick detection process of detecting whether or not a flick operation is performed at the touched position, a flick direction detection process of detecting a direction in which the flick operation is performed, and a display screen changing process of executing either of a first display screen changing process in which the number of images to be displayed on the display module is increased and images to be displayed on the display module are contracted to be displayed on the display module and a second display screen changing process in which the number of images to be displayed on the display module is decreased and images to be displayed on the display module are expanded to be displayed on the display module based on the direction in which the flick operation is performed in the flick direction detection process.

According to a third aspect of the invention, there is provided a computer readable storage medium which stores an image display program for causing a computer to realize an image display method in an image display unit including an input module having an operation screen which receives a touch input and a display module configured to display an image thereon, the computer readable storage medium which stores the image display program being configured to cause the computer to execute a touched state detection process of detecting whether or not the operation screen of the input module is being touched for a touch input, a touched position acquiring process of acquiring a touched position on the input module which is touched for the touch input, a flick detection process of detecting whether or not a flick operation is performed at the touched position, a flick direction detection process of detecting a direction in which the flick operation is performed, and a display screen changing process of executing either of a first display screen changing process in which the number of images to be displayed on the display module is increased and images to be displayed on the display module are contracted to be displayed on the display module and a second display screen changing process in which the number of images to be displayed on the display module is decreased and images to be displayed on the display module are expanded to be displayed on the display module based on the direction in which the flick operation is performed in the flick direction detection process.

BRIEF DESCRIPTION OF THE SEVERAL VIEWS OF THE DRAWINGS

FIG. 5 is a flowchart in relation to a screen scrolling performed in an image display unit according to the embodiment of the invention which can detect multiple touches.

FIG. 6 is a flowchart in relation to a screen scrolling performed in the image display unit according to the embodiment of the invention which can detect multiple touches.

DETAILED DESCRIPTION OF THE INVENTION

Figure 1:
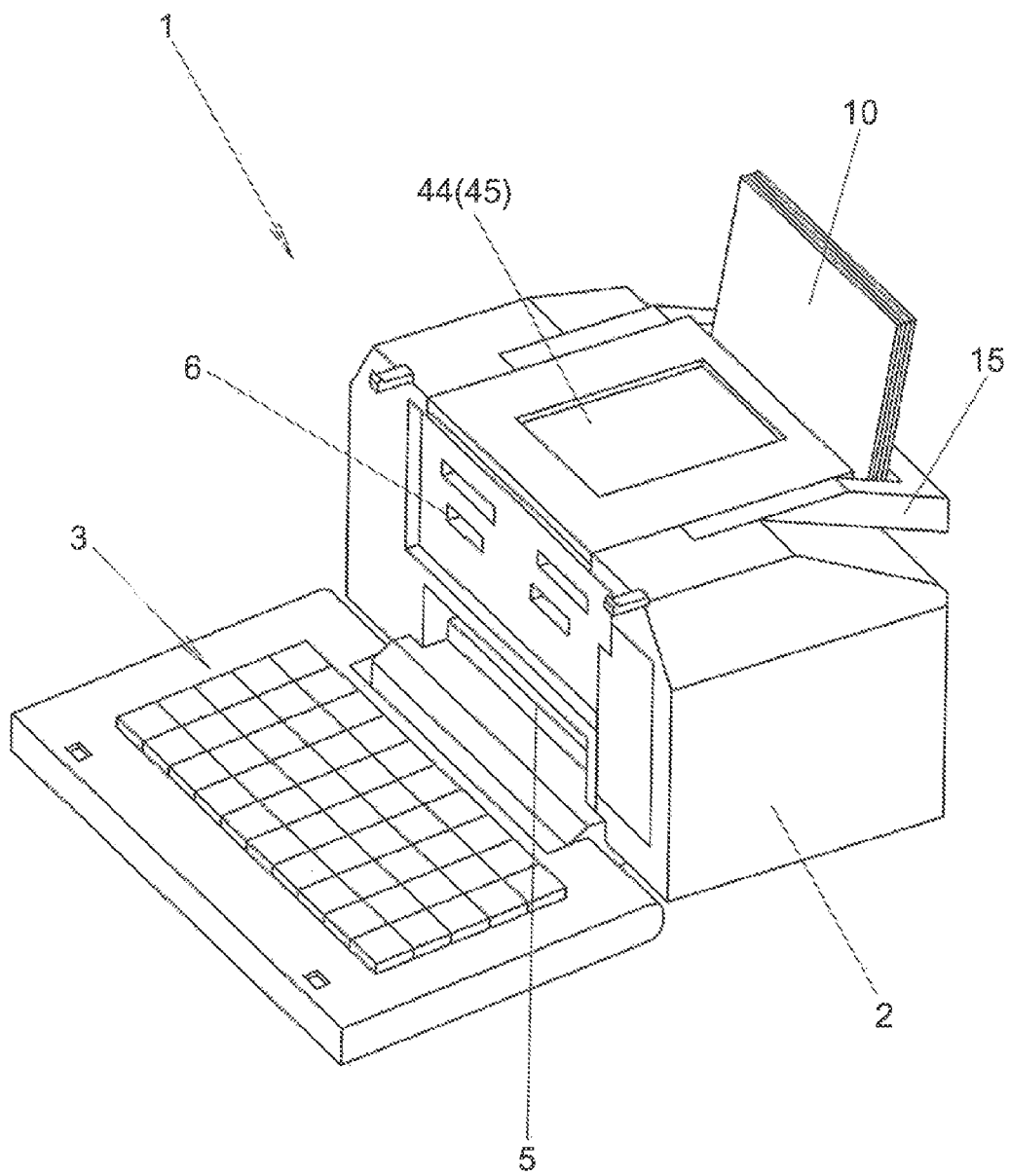
FIG. 1 is a perspective view of an image display unit according to an embodiment of the invention.
Figure 2:
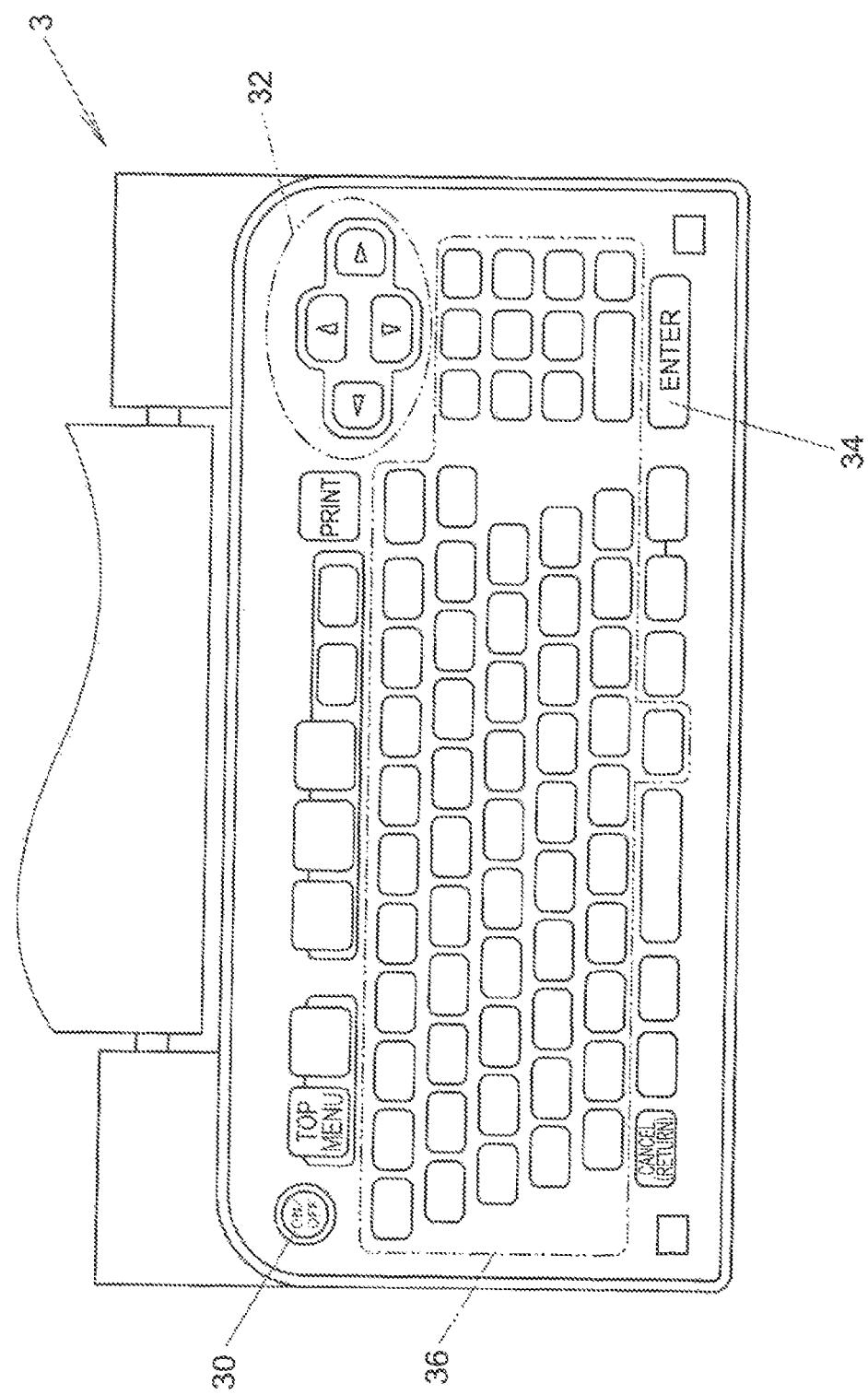
FIG. 2 is an explanatory diagram depicting a keyboard of the image display unit according to the embodiment of the invention.
Figure 3:
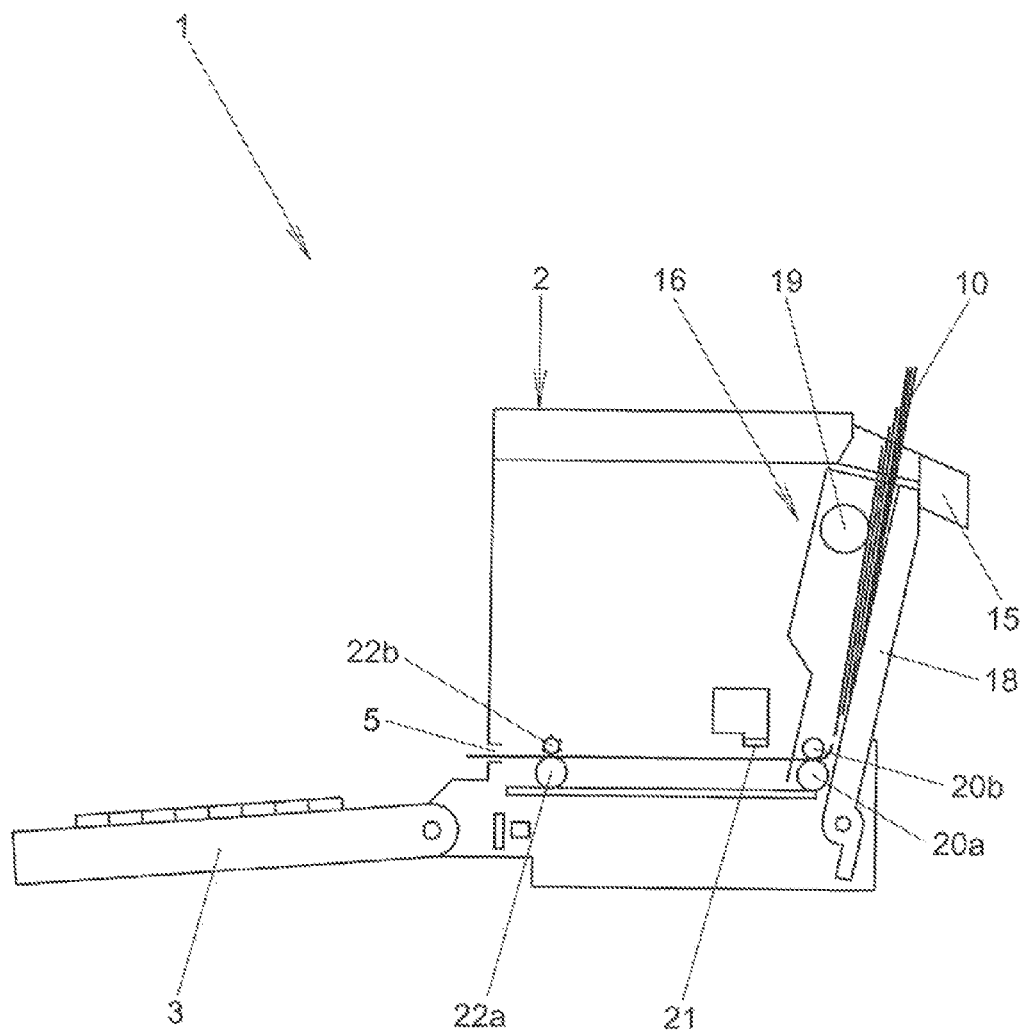
FIG. 3 is an exemplary sectional view of the image display unit according to the embodiment of the invention.

Hereinafter, an embodiment of the invention will be described in detail by reference to the drawings. The present invention relates to an image display unit 1 which can print selectively an image on a post card, for example. FIG. 1 is a perspective view depicting an external appearance of an image printer as the image display unit 1 according to an embodiment of the invention. FIG. 2 is an explanatory diagram depicting a keyboard 3 of the image display unit 1, and FIG. 3 is an exemplary side sectional view of the image display unit 1. It should be noted that hatching is excluded in FIG. 3 for the sake of easy understanding of the diagram.

The image display unit 1 is a printing unit which can also print an image or the like on relatively small-size printer paper 10 such as a post card (100×148 mm), L-size paper (89×127 mm) or 2L-size paper (178×127 mm) The image display unit 1 includes a function to print a photographic image captured by a digital camera or a scanned image on a post card or the like and also has various functions such as a function to prepare a list of addresses, a function to automatically print addresses on post cards from the list of addresses, a function to capture a photographic image or images and print them as pictures, a function to edit a sentence or sentences, and a function to print a combination of a captured image and a sentence on a post card.

Additionally, in setting a layout of a post card in a printing mode, the image display unit 1 of the invention displays thereon a plurality of images to be printed on a rear side of a post card such as pictures or illustrations and enables a quick selection of a desired image from the plurality of images displayed.

As shown in FIG. 1, this image display unit 1 includes a box-shaped case 2, and the keyboard 3, which functions as an input module, is disposed at the front of the case 2. The keyboard 3 is mounted rotatably near a front lower end of the case 2. Then, when in use, the keyboard 3 falls flat in front of the case 2 as shown in the figure, while when not in use, the keyboard 3 is retracted to stand facing oppositely a front surface of the case.

As shown in FIG. 2, disposed on this keyboard 3 are a power supply switch key 30 configured to turn on or off a power supply to the image display unit 1, cursor keys 32 configured to select an item and changes the contents of a setting for the selected item, an enter key 34 configured to determine on a selection of a target or a change made to the contents to advance an operation, a top menu key configured to display a top menu screen on a touch panel display module 44, a print key used to instruct the execution of printing, and character and numeric keys 36 used to enter characters and numbers. The individual keys function as input modules to transmit a predetermined operation signal to a control unit 41, which will be described later, based on input operations performed by a user.

As shown in FIG. 1, a sheet discharge opening 5 and a storage medium insertion slot 6 are formed in the front surface of the case 2. Printer paper 10 such as a post card on which required printing is completed or a printed picture is discharged from the sheet discharge opening 5, and a portable storage medium such as a memory card can be inserted into the storage medium insertion slot 6. By inserting a detachable portable storage medium such as a memory card into this storage medium insertion slot 6, image data of pictures which are captured by a digital camera, edit data of sentences which are edited by a personal computer and/or address data of a list of addresses made up of a plurality of address data can be captured into the image display unit 1, and data which is edited by the image display unit 1 can be saved in the memory card inserted.

In addition, a touch panel is disposed on a top surface of the case 2. In this touch panel, a touch panel input module 45 is provided on a surface of the touch panel display module 44 which is such as a liquid crystal display. The touch panel can be turned to a top surface side of the case 2. Various data needed in the image display unit 1 is displayed on the touch panel display module 44. Specifically, input details corresponding to input signals from the keyboard 3 are displayed on a screen of the touch panel display module 44. Alternatively, a menu screen necessary for various settings is displayed on the touch panel display module 44. Additionally, a photographic image captured from a digital camera or an image of an illustration to be used for a new year's post card or a Xmas card is also displayed on the touch panel display module 44.

The touch panel input module 45 has an operation surface which receives a touch input by a user, whereby a simple input operation is enabled by using the touch panel input module 45 without using the keyboard 3.

Further, a handle 15 is attached to an upper portion of the case 2 so as to be rotated from a rear side of the case 2 to a position above the case 2. This handle 15 has a substantially U-shape and is gripped on when carrying the image display unit 1.

As shown in FIG. 3, this image display unit 1, which is the image printer, has a hollow space portion 16 which is opened to a rear surface of the case 2, and a sheet feeding tray 18 is disposed so as to close an opening of the hollow space portion 16. This sheet feeding tray 18 is pivotally attached to the case 2 in a position lying near a lower portion at the rear of the case 2. The sheet feeding tray 18 can be rotated in such a way as to move back and forth at an upper end thereof, so that the sheet feeding tray 18 can hold a stack of sheets of print paper 10.

A pickup roller 19 is disposed in an upper position inside the sheet feeding tray 18 for feeding out sheets of print paper 10 held in the sheet feeding tray 18 sheet by sheet. Additionally, carrier rollers 20a, 20b are disposed near a lower end of the sheet feeding tray 18 for carrying the print paper 10 which is fed out downwards by the pickup roller 19 in the direction of the sheet discharge opening 5 in the case 2. Further, a print head 21, which is a printing mechanism, is disposed near and ahead of the carrier rollers 20a, 20b in an interior of the case 2. Additionally, sheet discharging rollers 22a, 22b are disposed ahead of the print head 21 in the interior of the case 2 for discharging the print paper 10 on which a required printing is completed from the sheet discharging opening 5. The carrier roller 20a and the sheet discharging roller 22a are controlled by stepping motors, not shown, to rotate so as to carry the print paper 10 at a predetermined speed. It should be noted that the pickup roller 19, the carrier rollers 20a, 20b and the sheet discharging rollers 22a, 22b function as a carrier mechanism in the image display unit 1.

The print head 21, which is the printing mechanism, is made to be an inkjet-type print head 21 which has nozzles from which yellow (Y), cyan (C), and magenta (M) inks are discharged individually, whereby the inks of Y, C and M colors are jetted from the respective nozzles onto a sheet of print paper 10 to execute a printing. Although the inkjet-type print head 21 is described here, the invention is not limited to the inkjet process.

Then, sheets of print paper 10 held in the sheet feeding tray 18 are fed out downwards sequentially from a frontmost sheet of print paper 10 in the stack of sheets of print paper 10 by the pickup roller 19, and each sheet of print paper 10 is fed out to a position directly below the print head 21 while being held between the carrier rollers 20a, 20b. Then, after a required printing is completed, the sheet of print paper 10 is carried while being held between the sheet discharging rollers 22a, 22b to thereby be discharged to the outside of the image display unit 1 from the sheet discharging opening 5.

Figure 4:
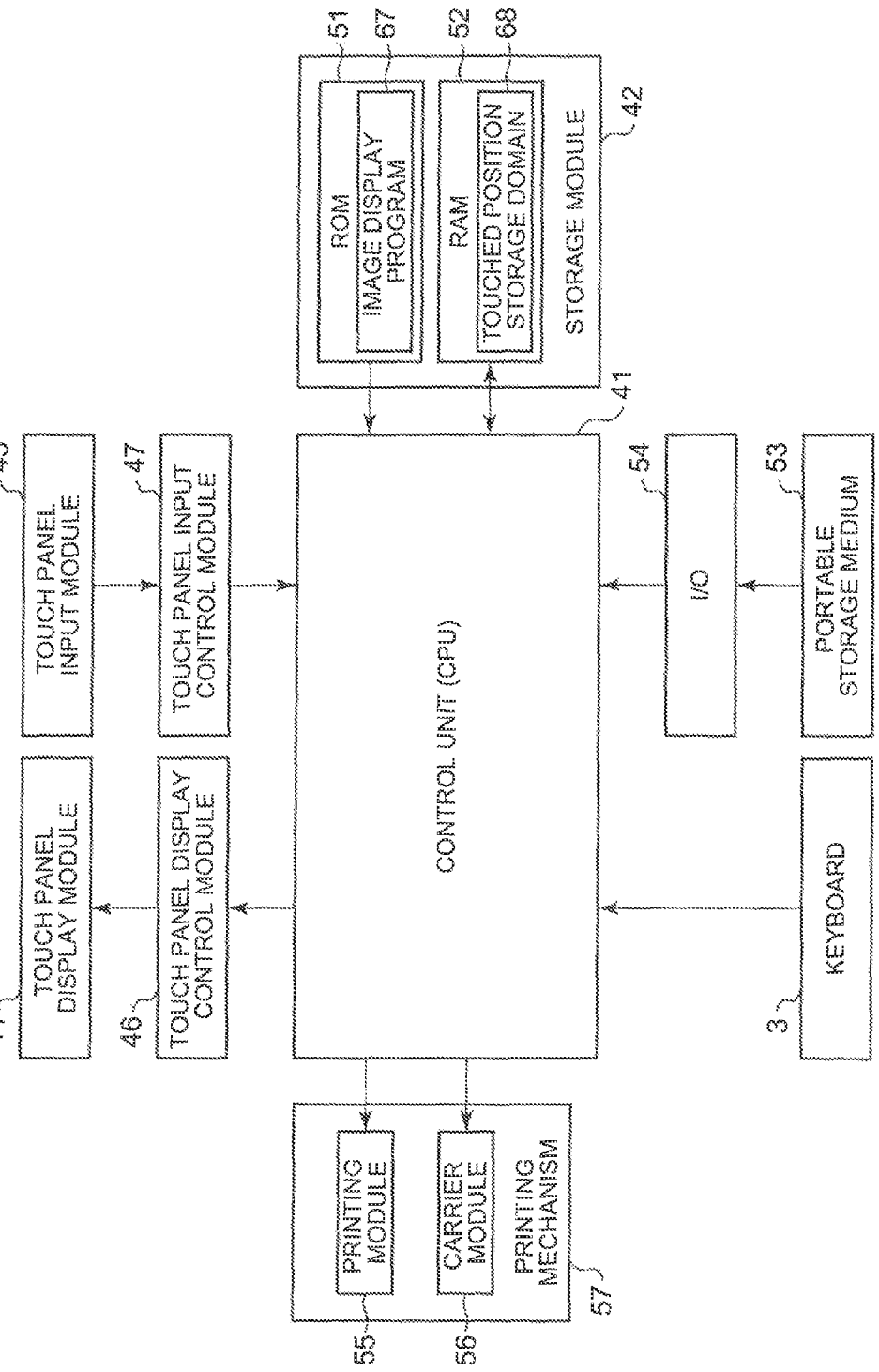
FIG. 4 is a functional block diagram of the image display unit according to the embodiment of the invention.

Next, a control circuit of the image display unit 1 of the embodiment will be described. FIG. 4 is a functional block diagram of the image display unit 1. As shown in FIG. 4, this image display unit 1 includes the control unit 41 which governs the whole system, a storage module 42 made up of a ROM 51, a RAM 52, a detachable portable storage medium 53 such as a memory card which is connected via an I/O 54, the touch panel display module 44, a touch panel display control module 46 which is a display screen changing module which controls the touch panel display module 44, the touch panel input module 45 and the keyboard 3 which constitute an input module, a touch panel input control module 47 which controls the touch panel input module 45, a printing mechanism 57, and a voice guidance module such as a loud speaker, not shown.

The input module has the keyboard 3 which is used by a user when the user performs an input operation, and the keyboard 3 has the power supply switch key 30, the cursor keys 32, the enter key 34, the print key and the like. Further, as the input module, the touch panel input control module 47 is provided, and the touch panel input control module 47 controls the touch panel input module 45. Then, the control unit 41 enables the change of screens and settings by, for example, a flick operation, a swipe operation, a tap operation, a touch operation, a pinch-in operation and a pinch-out operation which are operations to be performed on the touch panel input module 45.

The touch panel display module 44 is a panel on which various operation screens are displayed and is controlled by the control unit 41 which receives a predetermined operation signal to enable a predetermined operation screen to be displayed thereon via the touch panel display control module 46 which controls the touch panel display module 44.

The control unit 41 is a CPU and activates a program stored in advance in the ROM 51 or a program stored in the memory card in response to a key-entered operation signal from the input module or automatically, controlling the respective modules of the control circuit using the RAM 52 as a working memory.

A character font which is used in editing a sentence, a print font, information on standards of print papers to be edited, control programs used when the control unit 41 controls the respective modules and the like are stored in advance in the ROM 51.

In addition, an image display program 67 is stored in the ROM 51, and this image display program 67 enables a quick selection of an image such as a picture or an illustration to be printed on a rear surface of a post card in setting a layout of the post card or the like in a printing mode.

Additionally, data of an original image such as a photographic image captured by a digital camera or a scanned image can be stored in the read/write ROM 51 which is made up of a flash memory or the like by copying the data from the memory card via the control unit 41.

The RAM 52 is a working memory which stores information on the editing of a document such as characters inputted at the input module, display data to be displayed at the touch panel display module 44, information on an image which is under image processing, variables to be used in arithmetic operation and registers. Additionally, data of a photographic image captured by a digital camera or a scanned image is stored in the memory card.

Further, the RAM 52 has a touched position storage domain 68 which stores sequentially information on a touched position at the touch panel input module 45. By having the touched position storage domain 68, the control unit 41 enables the detection of various input operations on the touch panel input module 45 by a finger or fingers of the user.

In addition, the detachable portable storage medium 53 such as a memory card, which is an external memory, is allowed to be connected to the control unit 41 via the I/O 54 by being inserted into the storage medium insertion slot 6.

The printing mechanism 57 includes a printing module 55 and a carrier module 56. The printing module 55 is made up of the print head 21 described above and executes a process of printing data on the print paper 10. In addition, the carrier module 56 includes stepping motors which rotate rollers such as the pickup roller 19, the carrier rollers 20a, 20b and the sheet discharging rollers 22a, 22b, as described above and executes a process of carrying the print paper 10. The voice guidance module outputs an error sound and voice messages such voice guidance for operations to be performed.

In the image display unit 1 of the embodiment, in particular, in setting a layout of printing that is executed on a rear surface of a post card, the user needs to operate the image display unit 1 so as to enable the selection of a picture, an illustration and/or a sentence example from a plurality of selection images stored in advance. Then, the invention proposes how to select a predetermined image in an efficient and speedy fashion. Thus, operations will be described which are performed by the user with his or her finger or fingers on various screens which are displayed on the touch panel input module 45 in realizing the efficient and speedy image selection proposed by the invention.

Hereinafter, image selection using the touch panel input module 45 will be described in the image display unit 1 of the embodiment. The image display unit 1 is made to detect an input operation performed by the user with his or her finger or fingers, which are operation elements, through the touch panel input module 45.

Operations that are performed by the user with his or her finger or fingers and which are detected at the touch panel input module 45 by the touch panel input control module 47 include a "touch operation" and a "release operation." In addition to these independent operations, there are some operations which result from a combination of the touch operation and the release operation. They are a "swipe operation," a "flick operation," and a "tap operation."

The "touch operation" is an operation which is detected by the touch panel input control module 47 when the finger of the user is brought into touch with an operation screen of the touch panel input module 45.

The "release operation" is an operation which is detected by the touch panel input control module 47 when the finger which is in touch with the operation screen as a result of the touch operation is moved away from the operation screen.

The "swipe operation" is an operation which is detected by the touch panel input control module 47 when the release operation is performed after a touched position, which is a position on the operation screen of the touch panel input module 45 touched by the finger of the user, is shifted in such a way as to trace something with the finger kept in touch with the operation screen after the touch operation is performed and after an elapse of a first predetermined period of time (for example, one second) which is set in advance.

The "flick operation" is an operation which is detected by the touch panel input control module 47 when the release operation is performed after the touched position is shifted in such a way as to flick out something with the finger kept in touch with the operation screen after the touch operation is performed and before the elapse of the first predetermined period of time.

The "tap operation" is an operation which is detected by the touch panel input control module 47 when the operation screen of the touch panel input module 45 is tapped once or a plurality of times by the finger of the user in such a way as to strike the finger lightly against the operation screen. Namely, the "tap operation" is an operation which is detected by the touch panel input control module 47 when the release operation is performed without shifting the touched position after the touch operation is performed and before an elapse of a second predetermined period of time (for example, 0.5 second) which is set shorter than the first predetermined time.

Next, image display states of the touch panel display module 44 which is controlled by the control unit 41 will be described. When the user performs the various operations in the image display unit 1, images are displayed on the touch panel display module 44.

In selecting an image such as a picture or an illustration, when the "swipe operation" is performed, the control unit 41 causes the touch panel display module 44 to display the next image or the previous image thereon based on the direction in which the swipe operation is performed and executes screen scrolling.

In selecting an image such as a picture or an illustration, when the "flick operation" is performed, the control unit 41 causes the touch panel display module 44 to display the next image or the previous image thereon based on the direction in which the flick operation is performed, alike "swipe operation" and executes screen scrolling.

In addition, when the "tap operation" is performed, the control unit 41 functions, for example, as a prints number control module that sets the number of prints to be made based on the number of times of tapping and which produces a display state in which the number of prints so set is displayed together with a selected image. For example, when a "double tapping" operation which indicates that tapping is made twice is executed, the control unit 41 causes characters meaning "two prints" to be displayed together with the selected image, indicating that two prints of the selected image are produced.

In the image display unit 1 of the invention, when an image is attempted to be printed on a post card, selection images can be displayed in a divided fashion while the images are expanded or contracted on screens appearing on the touch panel display module 44 when an image selection is executed for selection of an image by scrolling the screen. Therefore, it is possible to make a quick selection of a target one from a number of photographic images for printing.

Specifically, the control unit 41 functions as a touched state detection module which detects whether or not the touch panel input module 45 is being touched by the user for touch input by controlling the touch panel input control module 47. It should be noted that this embodiment can be applied to either of a multi-touch detection and a single-touch detection in detecting a touch input.

When the control unit 41 as the touched state detection module detects that the touch panel input module 45 is touched by the user, the control unit 41 then functions as a touched position acquiring module to detect and acquire a position on the touch panel input module 45 where the touch panel input module 45 is actually touched by the user. By doing so, the control unit 41 can detect whether or not the touched state continues based on information on touched position which is sequentially stored in the touched position storage domain 68 of the RAM 52.

When the control unit 41 as the touched position acquiring module detects and acquires the touched position on the touch panel input module 45 continuously in terms of time, the control unit 41 then functions as a flick detection module which detects based on a change with time of the touched position which is stored sequentially in the touched position storage domain 68 of the RAM 52 whether or not a flick operation is being performed on the touch panel input module 45 in which the touched state is shifted in such a way as to flick out something and the release operation is performed before the elapse of the first predetermined time.

When the control unit 41 as the touched position acquiring module detects and acquires the touched position on the touch panel input module 45 continuously in terms of time, the control unit 41 then functions as a flick direction detection module which detects based on a change with time of the touched position which is stored sequentially in the touched position storage domain 68 of the RAM 52 whether or not a flick operation is such that the touched state is shifted in such a way as to slide and is then kept continuing and then detects the direction in which the flick operation is performed.

The control unit 41 functions as a display screen changing module which executes based on the direction of the flick operation either of a first display screen changing process in which by controlling the touch panel display control module 46, images displayed on screens of the touch panel display module 44 are contracted while scrolling the screen and the number of images displayed is increased and a second display screen changing process in which by controlling the touch panel display control module 46, images displayed on the screens of the touch panel display module 44 are expanded while scrolling the screen and the number of images displayed is decreased.

Specifically, for example, the control unit 41 functions as the flick direction detection module which executes the first display screen changing process when the flick operation is performed in an upward direction and executes the second display screen changing process when the flick operation is performed in a downward direction. On the contrary, the control unit 41 may function as a flick direction detection module which executes the second screen changing process when the flick operation is performed in the upward direction and executes the first screen changing process when the flick operation is performed in the downward direction.

Further, in detecting a touch input, when a multi-touch detective configuration is adopted, the control unit 41 detects a multiplicity of touches. Additionally, when a flick operation is performed in each of the multiplicity of touches, the control unit 41 functions as a pinch-in/pinch-out determination module which determines whether each flick operation is a pinch-in operation or a pinch-out operation based on the direction in which each flick operation is performed.

Specifically, for example, the control unit 41 functions as a pinch-in/pinch-out determination module which executes the first display screen changing process when determining that a plurality of touch inputs are pinch-in operations and executes the second display screen changing process when determining that the plurality of touch inputs are pinch-out operations. On the contrary, the control unit 41 may function as pinch-in/pinch-out determination module which executes the second display screen changing process when the plurality of touch inputs are the pinch-in operations and executes the first display screen changing process when the plurality of touch inputs are the pinch-out operations.

Additionally, the control unit 41 functions so that when determining that a pinch-in operation is performed, images which are displayed on screens of the touch panel input module 44 are contracted while scrolling the screen by controlling the display screen changing module to thereby increase the number of divisions on each of the screens.

In addition, the control unit 41 functions so that when determining that a pinch-out operation is performed, images which are displayed on screens of the touch panel input module 44 are expanded while scrolling the screen by controlling the display screen changing module to thereby decrease the number of divisions on each of the screens.

Further, when the control unit 41 as the touched state detection module detects that an image displayed on the touch panel display module 44 is touched and then that a tap operation or a flick operation is performed on the image displayed, the control unit 41 sets the number of prints to be made in accordance with the number of times of tapping or flicking.

Next, the flow of screen scrolling will be described in detail based on flowcharts which is executed to select a desired image from a number of images such as pictures or illustrations which are stored in advance to be printed on a rear surface of a post card in the image display unit 1. FIGS. 5 and 6 show flowcharts depicting the flow of screen scrolling using a touch panel which can detect multiple touches. FIGS. 7 to 14 are diagrams depicting the flows of first screen scrolling to eighth screen scrolling.

Firstly, when the user sets the image display unit 1 in the printing mode, a printing layout on a rear surface of a post card is set in the image display unit 1, and a selection of a desired image from a group of images stored in advance in the storage module 42 is set, the control unit 41 executes an initial image display process (step S101) of causing the touch panel display module 44 to display thereon an image of a message informing the user that "images are being read."

Next, the control unit 41 executes a RAM clearing process (step S105) of clearing away the information on touched positions on the touch panel input module 45 which is stored in the touched position storing domain 68 of the RAM 52.

When the RAM clearing process (step S105) is completed, the control unit 41 causes the touch panel display module 44 to display read images thereon, waiting for a selecting operation by the user. When a flick operation from the right to the left by the user is performed, for example, the control unit 41 executes screen scrolling on the touch panel display module 44 to change images from a first image to a second image.

Namely, when the touch panel input module 45 is touched in the waiting state, the control unit 41 functions as the touched state detection module and the touched position acquiring module to executes a touched position detection process (step S110) of detecting a touched position.

Then, the control unit 41 executes the touched position detection process (step S110) in succession and functions as a multi-touch detection module to execute a multi-touch determination (step S115) to detect whether the number of touched location is one or two. Namely, the control unit 41 as the multi-touch detection module detects whether or not a plurality of touch inputs are made on the operation screen of the touch panel input module 45 in a simultaneous fashion.

If it is determined in the multi-touch determination (step S115) that the number of touched locations is one, the flow of screen scrolling proceeds to (1) of the flowchart shown in FIG. 6, which will be described later. On the other hand, if it is determined that the number of touched locations is two, the flow of screen scrolling proceeds to a touched position storage process (step S120).

In the touched position storage process (step S120), the control unit 41 functions as the touched position acquiring module to store sequentially coordinates of the two touched positions where the user touches the operation screen of the touch panel input module 45 in the touched position storage domain 68 of the RAM 52 as information on the touched positions.

The control unit 41 executes again the touched position detection process (step S125) after an elapse of a predetermined period of time after the coordinates of the two touched positions have been stored in the touched position storage domain 68 of the RAM 52 to determine whether or not the two touch operations are performed continuously.

Then, in order to detect a change in the touched state in which the two locations are touched, the control unit 41 executes again the multi-touch detection (step S130). If it is determined in the multi-touch determination (step S130) that the number of touched locations is changed from two to one or zero, the flow of screen scrolling returns to the RAM clearing process (step S105). On the other hand, if it is determined that the number of touched locations remains two, the flow of screen scrolling proceeds to a touched position shift determination (step S135).

If it is determined in the touched position shift determination (step S135) that the touched locations are not shifted, the flow of screen scrolling returns to the touched position detection process (step S125) after an elapse of a predetermined period of time, whereafter the multi-touch determination (step S130) and the touched position shift determination (step S135) are repeated.

Then, if it is determined in the touched position shift determination (step S135) that the touched locations are shifted, the flow of screen scrolling proceeds to a touched position shifted locations number determination (step S140).

If it is determined in the touched position shifted locations number determination (step S140) that only one of the two touched positions is shifted while the other remains stationary, the flow of screen scrolling proceeds to a flick determination (step S200). On the other hand, if it is determined that the number of touched position shifted locations is two, the flow of screen scrolling proceeds to a flicking times number determination (step S145).

Figure 13A:
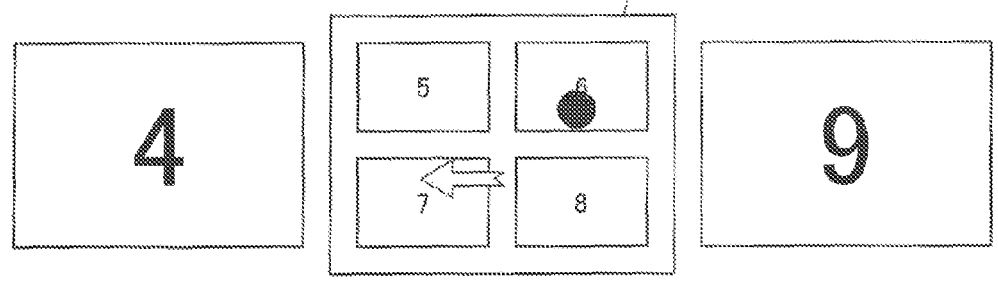
FIG. 13A, 13B and 13C are diagrams depicting the flow of a seventh screen scrolling of the image display unit according to the embodiment of the invention.
Figure 13B:
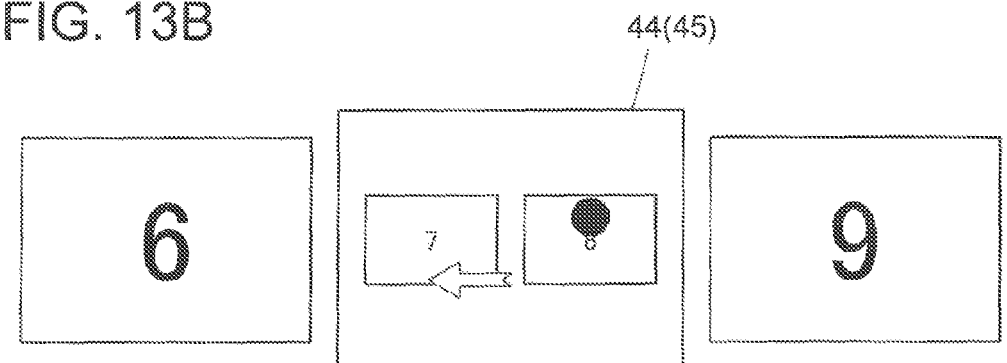
Figure 13C:
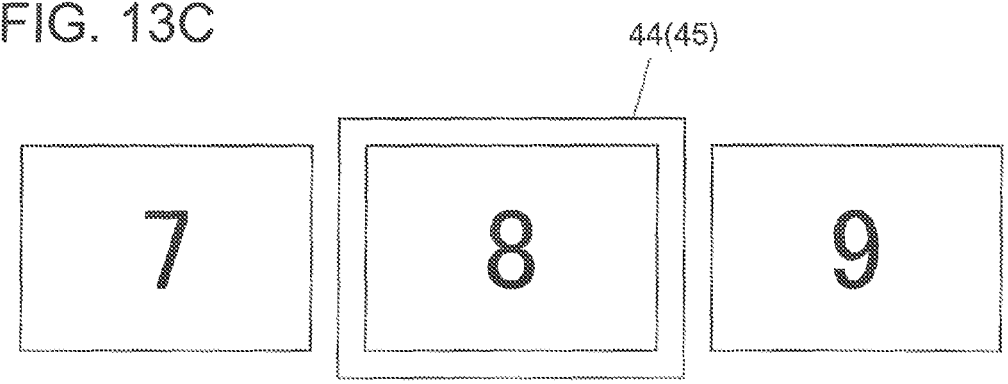
Figure 14A:
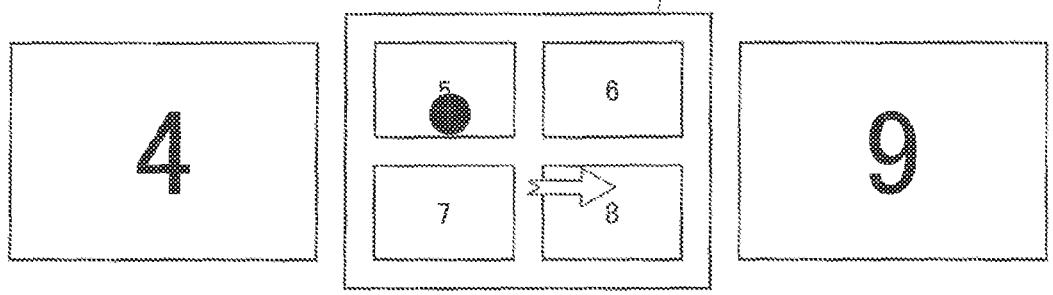
FIG. 14A, 14B and 14C are diagrams depicting the flow of an eighth screen scrolling of the image display unit according to the embodiment of the invention.
Figure 14B:
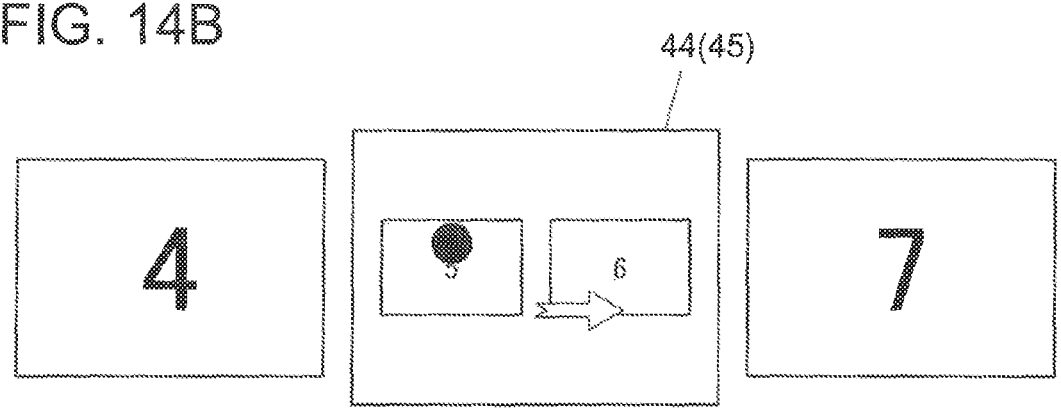
Figure 14C:
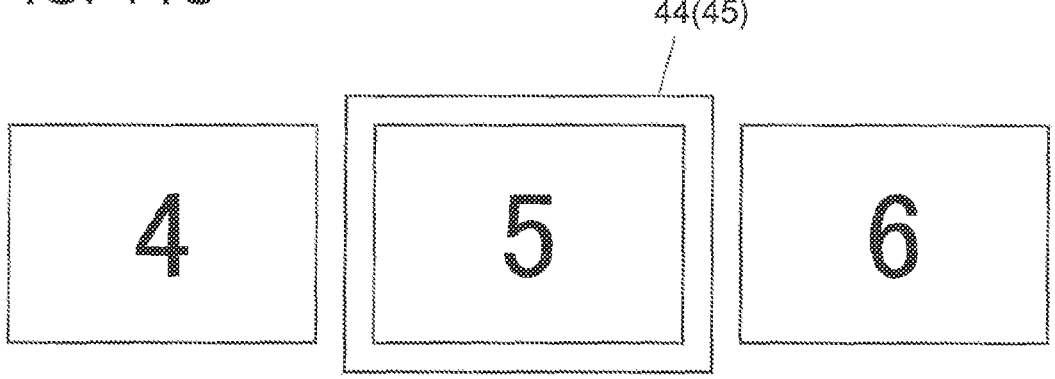

If it is determined in the flick determination (step S200) which is executed when the number of touched position shifted locations is one that the touched position is shifted by a flick operation, the control module 41 functions as an increased/decreased difference determination module which determines whether a differential value which is a difference in an X coordinate between touched positions is increased or decreased in an increased/decreased differential value determination (step S205). If it is determined that the differential value is increased, the number of images is decreased in an image number decreasing process (step S210), further, it is determined in a flick direction determination (step S215) whether the flick operation is a left flick operation in which the flick operation is performed from the right to the left or a right flick operation in which the flick operation is performed from the left to the right. If it is determined that the flick operation is the left flick operation, as shown in FIGS. 13A, 13B, the number of images to be displayed on the screen is decreased from four to two. As this occurs, an endmost image (an image having a largest index) invariably remains displayed and an image is displayed which has an index consecutive with that of the endmost image. In the event that the number of images displayed on the screen when the image decreasing operation is performed is two, as shown in FIGS. 13B, 13C, the number of images to be displayed on the screen is decreased from two to one. Also, if it is determined in the flick direction determination (step S215) that the flick operation is the right flick operation, as shown in FIGS. 14A, 14B (or FIGS. 14B, 14C), the number of images to be displayed on the screen is decreased from four to two (or from two to one). As this occurs, a frontmost image (an image having a smallest index) invariably remains displayed and an image is displayed which has an index consecutive with that of the frontmost image.

Figure 11A:
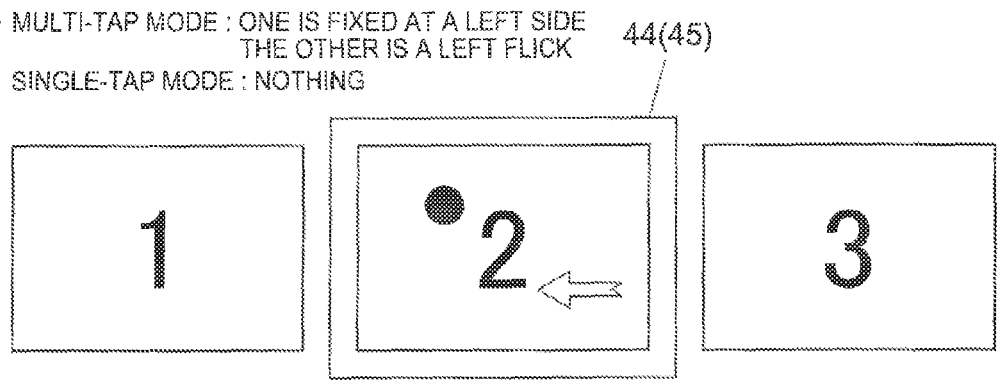
FIG. 11A, 11B and 11C are diagrams depicting the flow of a fifth screen scrolling of the image display unit according to the embodiment of the invention.
Figure 11B:
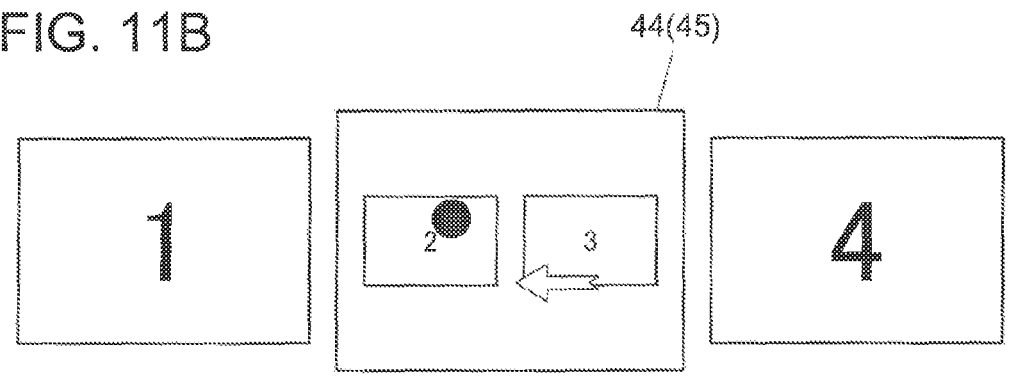
Figure 11C:
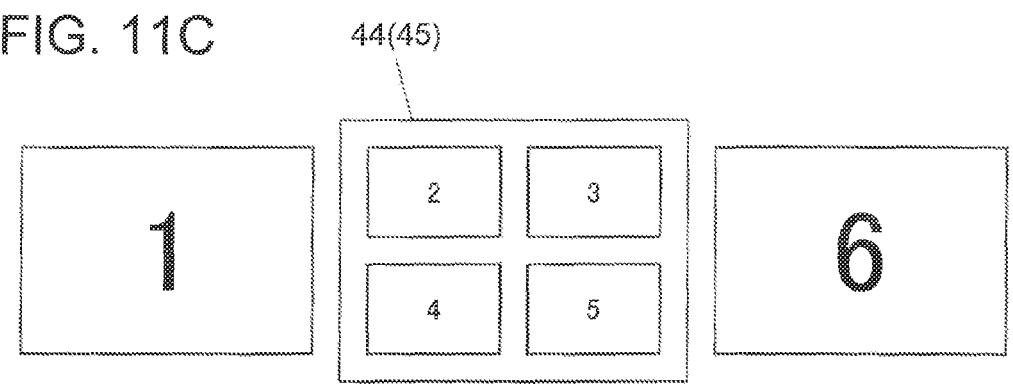
Figure 12A:
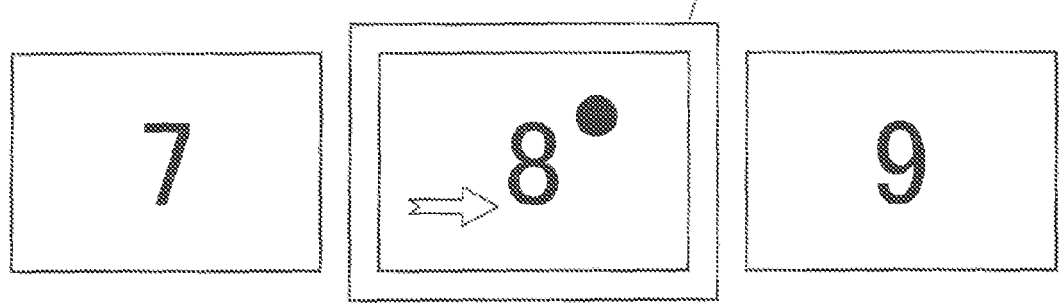
FIG. 12A, 12B and 12C are diagrams depicting the flow of a sixth screen scrolling of the image display unit according to the embodiment of the invention.
Figure 12B:
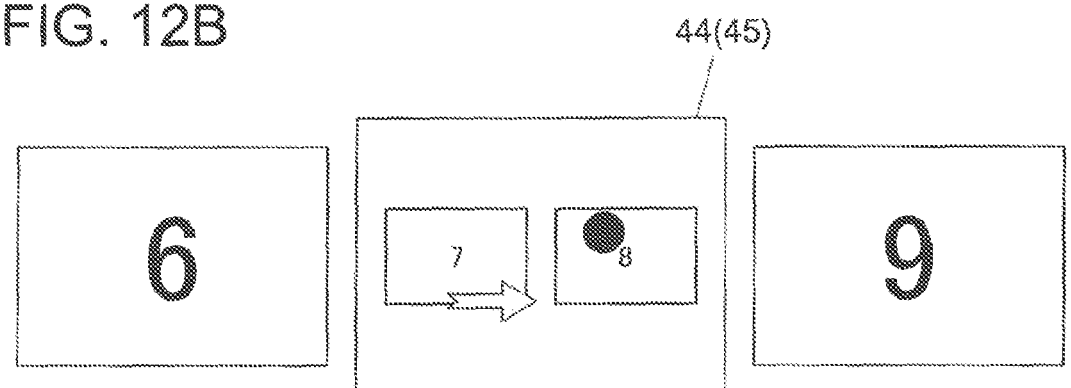
Figure 12C:
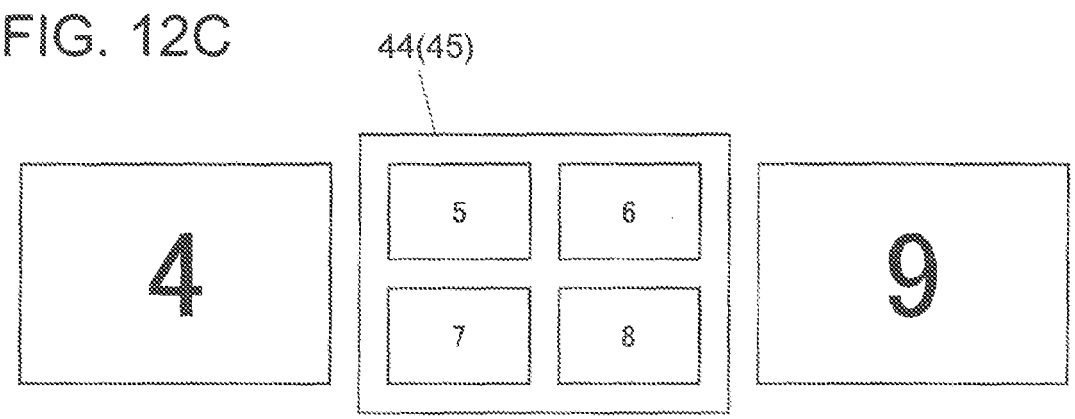

In addition, if it is determined in the increased/decreased differential value determination (step S205) that the differential value is decreased, the number of images is increased in an image increasing process (step S230), and further, it is determined in a flick direction determination (step S235) whether the flick operation is the left flick operation in which the flick operation is performed from the right to the left or the right flick operation in which the flick operation is performed from the left to the right. If it is determined that the flick operation is the left flick operation, as shown in FIGS. 11A, 11B, the number of images to be displayed on the screen is increased from one to two. As this occurs, a frontmost image (an image having a smallest index) invariably remains displayed and an image is displayed which has an index consecutive with that of the frontmost image. In the event that the number of images displayed on the screen when the image increasing operation is performed is two, as shown in FIGS. 11B, 11C, the number of images to be displayed on the screen is increased from two to four. Also, if it is determined in the flick direction determination (step S235) that the flick operation is the right flick operation, as shown in FIGS. 12A, 12B (or FIGS. 12B, 12C), the number of images to be displayed on the screen is increased from one to two (or from two to four). As this occurs, an endmost image (an image having a largest index) invariably remains displayed and an image is displayed which has an index consecutive with that of the endmost image. If the respective processes in steps S220, S225, S240, S245 are completed, or if it is determined in steps S215, S235 that the flick operation is neither the left flick operation nor the right flick operation, or if it is determined in step S205 that the differential value is not changed, the flow of screen scrolling returns to the RAM clearing process (step S105).

In the flicking times number determination (step S145) which is executed when the number of touched position shifted locations is two, if it is determined that the two touched position shifted locations are both shifted by the flick operation, the flow of screen scrolling proceeds to a pinch-in determination (step S150). On the other hand, if it is determined that either of the two touched position shifted locations is not shifted by the flick operation, the flow of screen scrolling returns again to the touched position detection process (step S125), and following this, the multi-touch determination (step S130) and the touched position shift determination (step S135) are repeated.

In the pinch-in determination (step S150), if the control unit 41 detects that two upper and lower locations are touched and that an upper touched position is shifted from top to bottom in a Y-coordinate while the other lower touched position is shifted from bottom to top in the Y-coordinate, the control unit 41 determines that the two touched positions are shifted by a pinch-in operation.

Figure 7A:
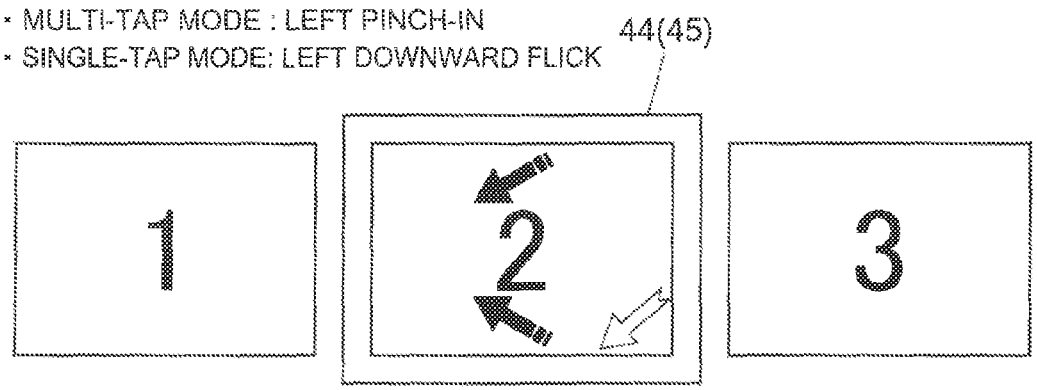
FIG. 7A, 7B and 7C are diagrams depicting the flow of a first screen scrolling of the image display unit according to the embodiment of the invention.
Figure 7B:
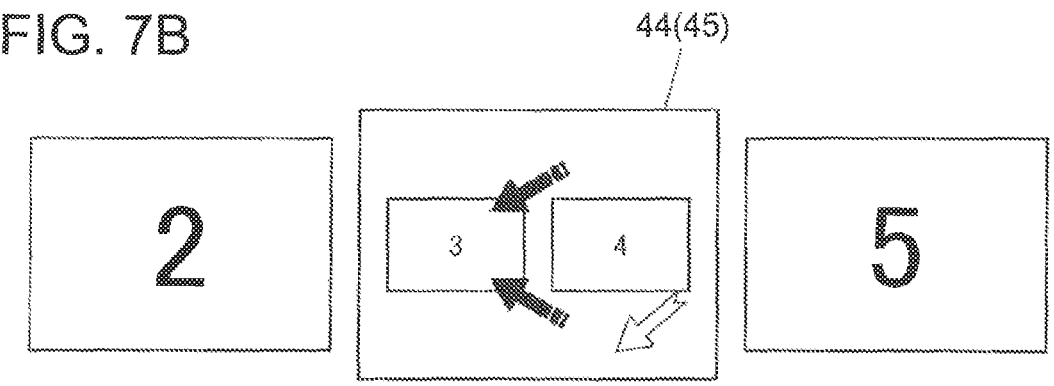
Figure 7C:
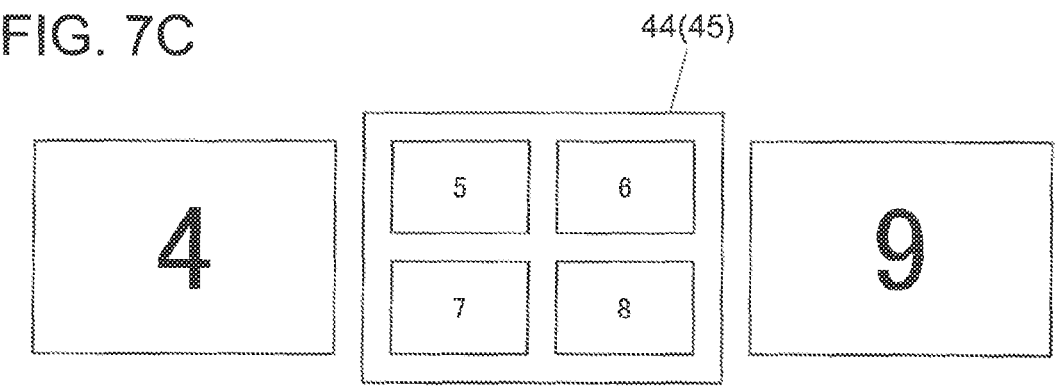
Figure 8A:
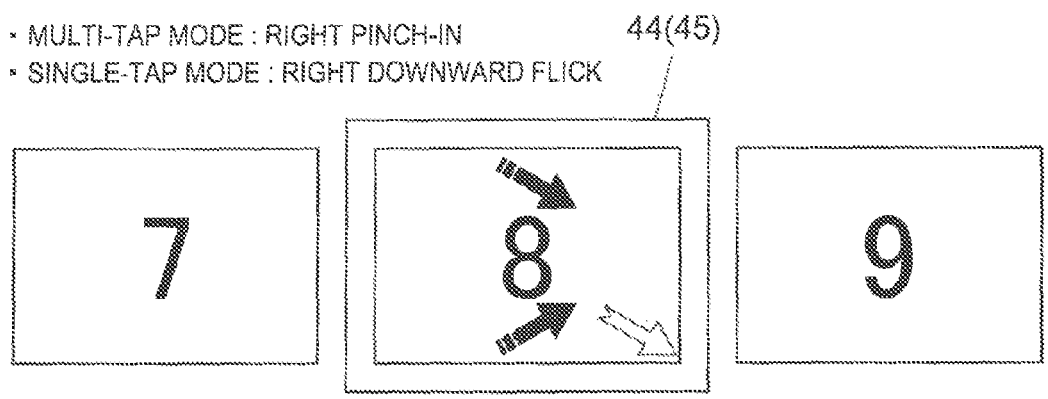
FIG. 8A, 8B and 8C are diagrams depicting the flow of a second screen scrolling of the image display unit according to the embodiment of the invention.
Figure 8B:
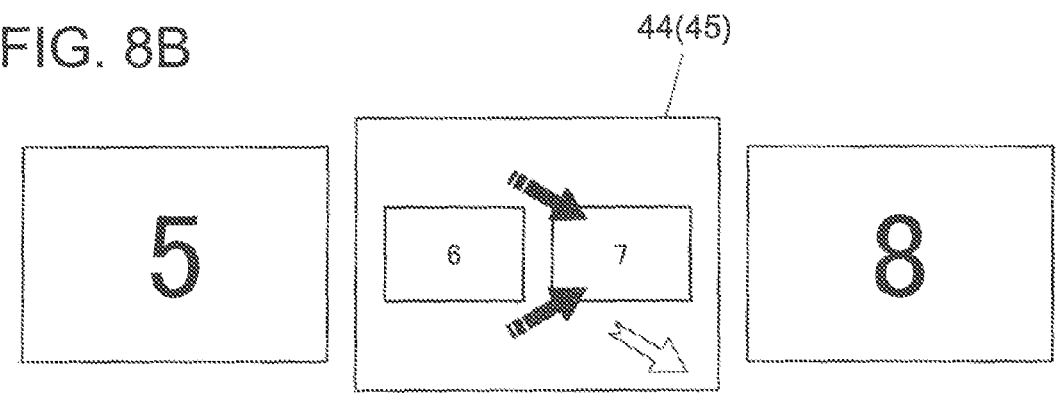
Figure 8C:
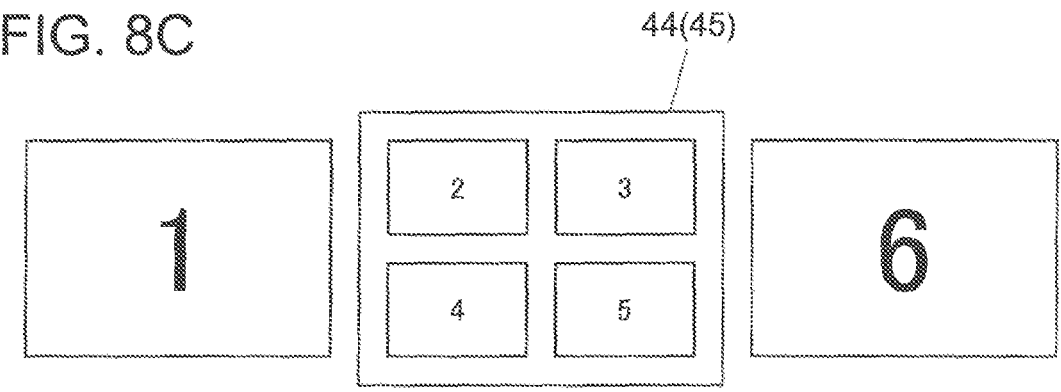

Then, if it is determined in the pinch-in determination (step S150) that the two touched positions are shifted by the pinch-in operation, then, the number of images is increased in an images number increasing process (step S155). Further, it is determined in a pinch-in direction determination (step S160) whether the pinch-in operation is a left pinch-in operation in which the pinch-in operation is performed from the right to the left or a right pinch-in operation in which the pinch-in operation is performed from the left to the right. If it is determined that the pinch-in operation is the left pinch-in operation, as shown in FIGS. 7A, 7B, the number of images to be displayed on the screen is increased from one to two. As this occurs, the image which is displayed before the left pinch-in operation is performed is hidden and images having indexes larger than that of the image displayed before the left pinch-in operation are displayed. Namely, the control unit 41 executes a succeeding image display process of displaying an image which succeeds the image which is currently displayed on the touch panel display module 44. In the event that two images are displayed when the left pinch-in operation is performed, as shown in FIGS. 7B, 7C, the number of images to be displayed on the screen is increased from two to four. Also, if it is determined in the pinch-in direction determination (step S160) that the pinch-in operation is the right pinch-in operation, as shown in FIGS. 8A, 8B (or FIGS. 8B, 8C), the number of images to be displayed on the screen is increased from one to two (or from two to four). As this occurs, the image which is displayed before the right pinch-in operation is performed is hidden and images having indexes smaller than that of the image displayed before the right pinch-in operation are displayed. Namely, the control unit 41 executes a preceding image display process of displaying an image which precedes the image which is currently displayed on the touch panel display module 44. If it is determined in the pinch-in determination (step S150) that the touched positions are shifted by an operation other than the pinch-in operation, the flow of screen scrolling proceeds to a pinch-out determination (step S175).

In the pinch-out determination (step S175), if the control unit 41 detects that two upper and lower locations are touched and that an upper touched position is shifted from the right to the left in the X-coordinate and is shifted from bottom to top in the Y-coordinate, that is, the upper touched position is shifted in a left upward direction and the other lower touched position is shifted from the right to the left in the X-coordinate and is shifted from top to bottom in the Y-coordinate, that is, the other lower touched position is shifted in a left downward direction, the control unit 41 determines that the two touched positions are shifted by a left pinch-out operation.

Figure 9A:
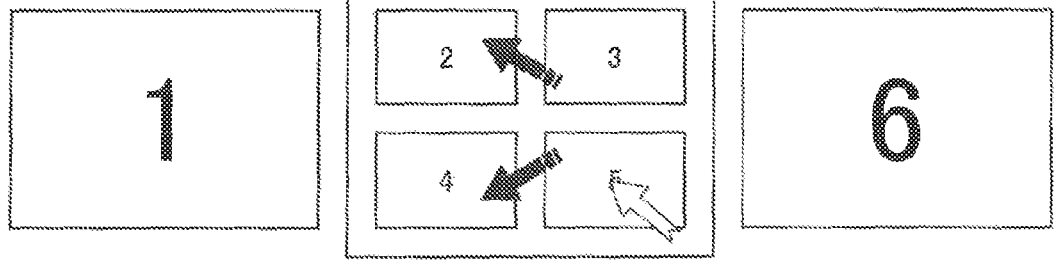
FIG. 9A, 9B and 9C are diagrams depicting the flow of a third screen scrolling of the image display unit according to the embodiment of the invention.
Figure 9B:
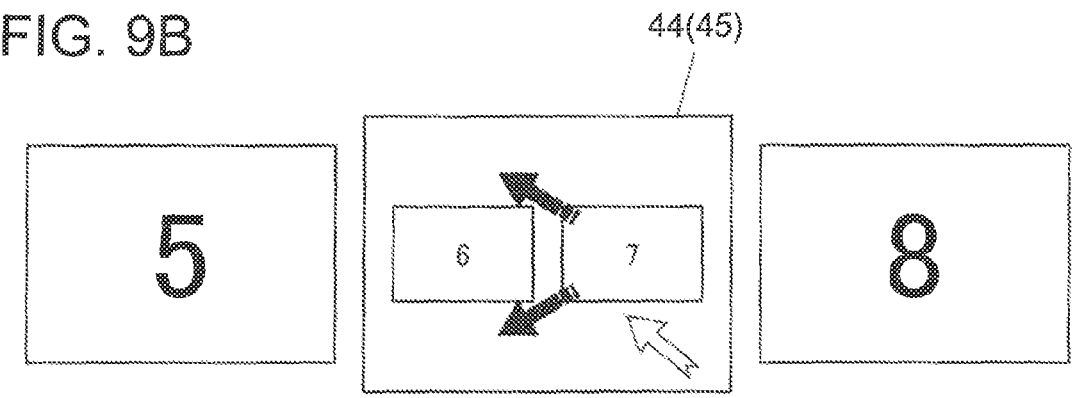
Figure 9C:
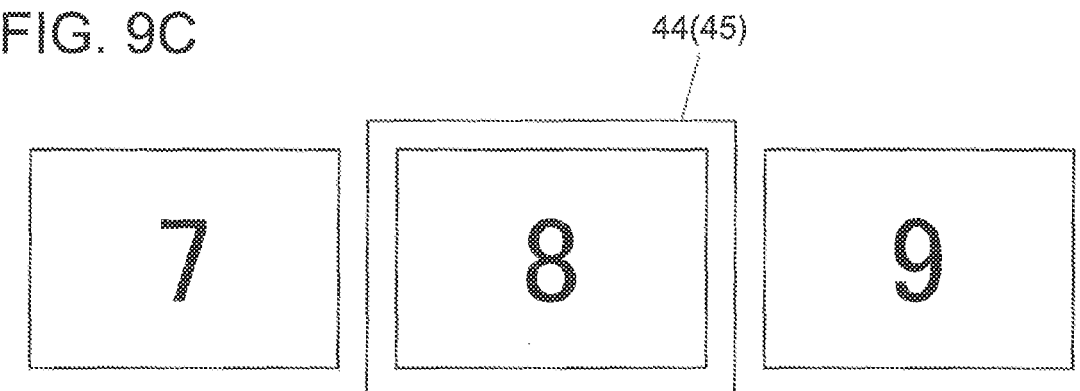
Figure 10A:
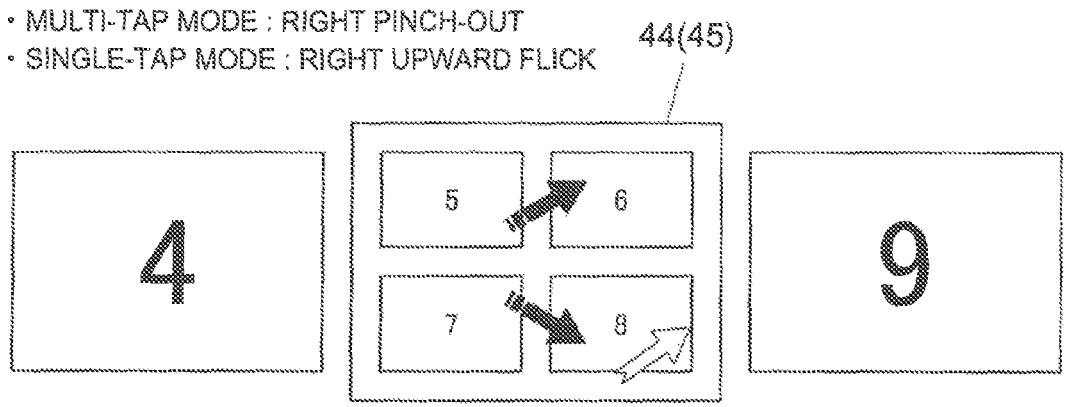
FIG. 10A, 10B and 10C are diagrams depicting the flow of a fourth screen scrolling of the image display unit according to the embodiment of the invention.
Figure 10B:
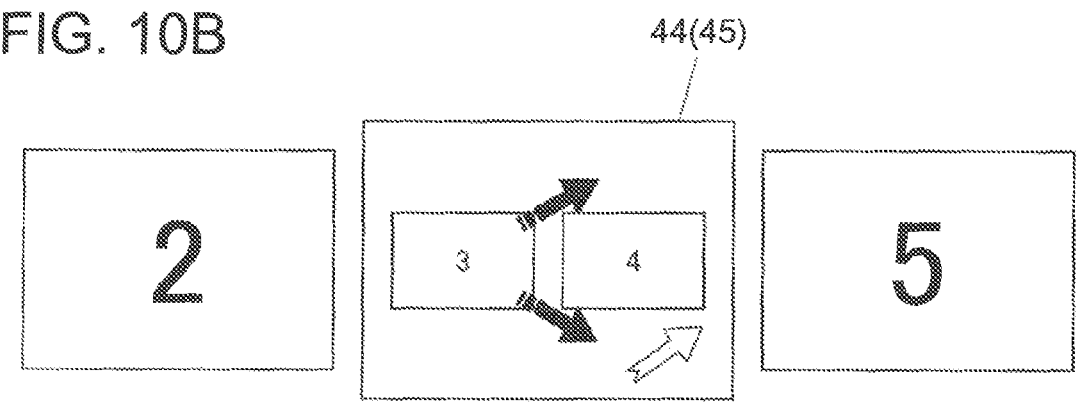
Figure 10C:
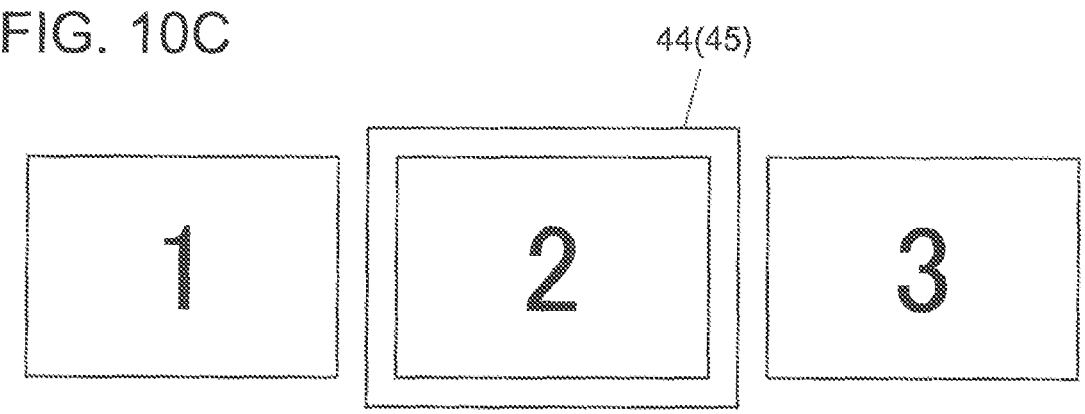

Then, if it is determined in the pinch-out determination (step S175) that the two touched positions are shifted by the pinch-out operation, then, the number of images is decreased in an images number decreasing process (step S180). Further, it is determined in a pinch-out direction determination (step S185) whether the pinch-out operation is a left pinch-out operation in which the pinch-out operation is performed from the right to the left or a right pinch-out operation in which the pinch-out operation is performed from the left to the right. If it is determined that the pinch-out operation is the left pinch-out operation, as shown in FIGS. 9A, 9B, the number of images to be displayed on the screen is decreased from four to two. As this occurs, the images which are displayed before the left pinch-out operation is performed are hidden and images having indexes larger than those of the images displayed before the left pinch-out operation are displayed. Namely, the control unit 41 executes a succeeding image display process of displaying an image which succeeds the image which is currently displayed on the touch panel display module 44. In the event that two images are displayed when the left pinch-out operation is performed, as shown in FIGS. 9B, 9C, the number of images to be displayed on the screen is decreased from two to one. Also, if it is determined in the pinch-out direction determination (step S185) that the pinch-out operation is the right pinch-in operation, as shown in FIGS. 10A, 10B (or FIGS. 10B, 10C), the number of images to be displayed on the screen is decreased from four to two (or from two to one). As this occurs, the images which are displayed before the right pinch-out operation is performed are hidden and images having indexes smaller than those of the images displayed before the right pinch-out operation are displayed.

Namely, the control unit 41 executes a preceding image display process of displaying an image which precedes the image which is currently displayed on the touch panel display module 44. If the respective processes in steps S165, S170, S190, S195 are completed, or if it is determined in steps S160, S185 that the pinch operation is neither the left pinch operation nor the right pinch operation, or if it is determined in step S175 that the touched positions are not shifted by the pinch-out operation, the flow of screen scrolling returns to the RAM clearing process (step S105).

Then, if it is determined in the multi-touch determination (step S115) that the number of touched locations is one, the flow of screen scrolling proceeds to (1) in the flowchart shown in FIG. 6.

As a touched position storage process (step S220), the control unit 41 causes coordinates of one touched position to be stored in the touched position storage domain 68 of the RAM 52 as touched position information.

The control unit 41 executes again a touched position detection process (step S225) after the coordinates of the one touched position are stored in the touched position storage domain 68 of the RAM 52 and after an elapse of a predetermined period of time to determined whether or not the touch operation is continuous.

Then, if the control unit 41 determines in a touch determination (step S230) that the number of touched positions is not one, the flow of screen scrolling proceeds to (2) and returns to the RAM clearing process (step S105) in the flowchart shown in FIG. 5.

If it is determined in the touch determination (step S230) that the touched state is held, the flow of screen scrolling proceeds to a touched position shift determination (step S240) in which it is determined whether or not the touched position is shifted. If it is determined in the touched position shift determination (step S240) that the touched location is not shifted, the flow of screen scrolling returns to the touched position detection process (step S225) again.

If it is determined in the touched position shift determination (step S240) that the touched location is shifted, the flow of screen scrolling proceeds to a flick determination (step S260). If it is determined in the flick determination (step S260) that the touched location is shifted by a flick operation, the screen is scrolled (step S270) so as to display the next image on the touch panel display module 44, and the flow of screen scrolling proceeds to (2) and returns to the RAM clearing process (step S105) in the flowchart shown in FIG. 5.

If it is determined in the flick determination (step S260) that the touched location is shifted by an operation other than the flick operation, the flow of screen scrolling proceeds to (2) and returns to the RAM clearing process (step S105) in the flowchart shown in FIG. 5.

Then, when a "tap operation" is performed on the touch panel input module 45 to set the number of prints to be made by the user with respect to an image which is selected by the series of operations, the number of prints is set according to the number of times of tapping. The series of operations that has been described heretofore constitutes the operation example made on the touch panel which can detect multiple touches.

Figure 15:
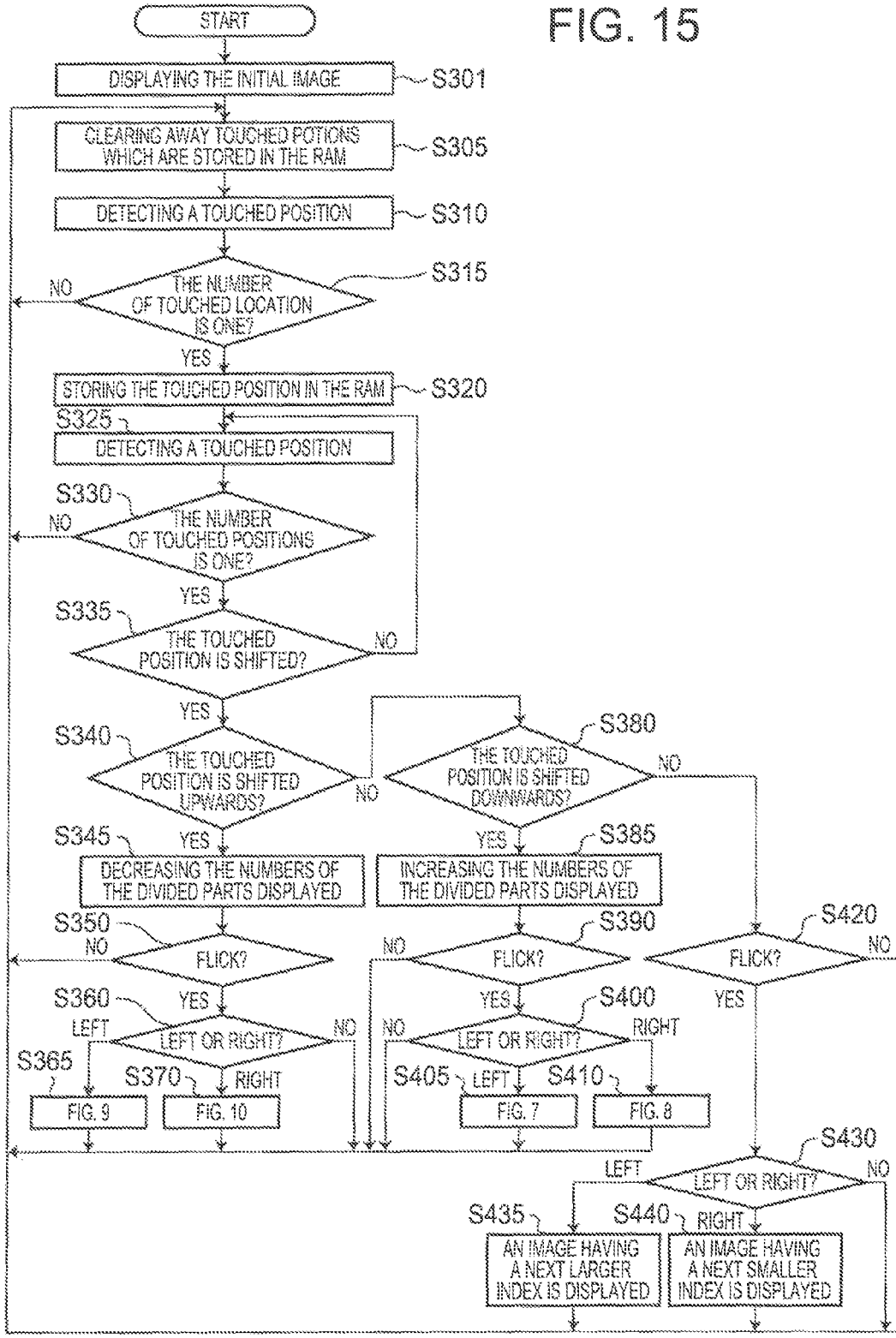
FIG. 15 is a flowchart in relation to a screen scrolling performed in the image display unit according to the embodiment of the invention which can detect a single touch.

Next, a flow of screen scrolling will be described in detail based on a flowchart which is performed to select a desired image from a number of images such as pictures or illustrations to print it on a rear surface of a post card in the image display unit 1 including a touch panel which detects a single touch. FIG. 15 is a flowchart depicting a flow of screen scrolling using a touch panel which can detect a single touch. It should be noted that the touch panel which can detect a single touch means a touch panel which is designed to detect in principle only one of touched positions on a touch panel input module 45.

Firstly, when the user sets the image display unit 1 in the printing mode, a printing layout on a rear surface of a post card is set in the image display unit 1, and a selection of a desired image from a group of images stored in advance in the storage module 42 is set, the control unit 41 executes an initial image display process (step S301) of causing the touch panel display module 44 to display thereon an image of a message informing the user that "images are being read."

Next, the control unit 41 executes a RAM clearing process (step S305) of clearing away the information on touched positions on the touch panel input module 45 which is stored in the touched position storing domain 68 of the RAM 52.

When the RAM clearing process (step S105) is completed, the control unit 41 causes the touch panel display module 44 to display read images thereon, waiting for a selecting operation by the user. When a flick operation is performed from the right to the left by the user, for example, the control unit 41 executes screen scrolling on the touch panel display module 44 to change images from a first image to a second image.

Namely, when the touch panel input module 45 is touched in the waiting state, the control unit 41 functions as the touched state detection module and the touched position acquiring module to executes a touched position detection process (step S310) of detecting a touched position.

Then, the control unit 41 executes the touched position detection process (step S310) in succession and functions as a single-touch detection module to execute a touched locations number determination (step S315) to detect whether or not the number of touched location is one.

If it is determined in the touched locations number determination (step S315) that the number of touched locations is one, the flow of screen scrolling proceeds to a touched position storage process (step S320). On the other hand, if it is determined that the number of touched locations is more than one, the determination on touched locations is reset, and the flow of screen scrolling returns to the RAM clearing process (step S305).

As the touched position storage process (step S320), the control unit 41 causes coordinates of the touched position where the user touches the operation screen of the touch panel input module 45 to be stored in the touched position storage domain 68 of the RAM 52 as information on the touched position.

The control unit 41 executes again the touched position detection process (step S325) after the coordinates of the touched position are stored in the touched position storage domain 68 of the RAM 52 and after an elapse of a predetermined period of time to determine whether or not the touch operation is continuous.

Then, in order to detect a change in the touched state, the control unit 41 executes again the touched locations number determination (step S330). If it is determined in the touched locations number determination that the number of touched locations is more than one, the flow of screen scrolling returns to the RAM clearing process (step S305). On the other hand, if it is determined that the number of touched locations remains one, the flow of screen scrolling proceeds to a touched position shift determination (step S335).

If it is determined in the touched position shift determination (step S335) that the touched location is not shifted, the flow of screen scrolling returns to the touched position detection process (step S325) again, whereafter the touched locations number determination (step S330) and the touched position shift determination (step S335) are repeated.

Then, if it is determined in the touched position shift determination (step S335) that the touched location is shifted, the flow of screen scrolling proceeds to a touched position shifted direction determination (step S340) in which it is determined whether or not the touched position is shifted upwards in the Y-coordinate.

If it is determined in the touched position shifted direction determination (step S340) that the touched position is shifted upwards in the Y-coordinate, the flow of screen scrolling proceeds to a display divisions number decreasing process (step S345). On the other hand, if it is determined that the touched position is not shifted upwards in the Y-coordinate, the flow of screen scrolling proceeds to a downward shift determination (step S380).

In the display divisions number decreasing process (step S345), the control unit 41 changes the screen, for example, from a screen divided into four equal parts displaying four images or a quartered screen to a screen divided into two equal parts displaying two images or a halved screen to expand the images. Following this, in a flick determination (step S350), it is determined whether or not the operation performed on the touch panel input module is a flick operation. If it is determined that the operation is the flick operation, then, it is determined in a flick direction determination (step S360) whether the flick operation is a left flick operation in which the flick operation is performed from the right to the left or a right flick operation in which the flick operation is performed from the left to the right. If it is determined that the flick operation is the left flick operation, as shown in FIGS. 9A, 9B, the number of images to be displayed on the screen is decreased from four to two. As this occurs, the images which are displayed before the left flick operation is performed are hidden and images having indexes larger than those of the images which are displayed before the left flick operation are displayed. Namely, the control unit 41 executes a succeeding image display process of displaying an image which succeeds the image which is currently displayed on the touch panel display module 44. In the event that the number of images displayed on the screen when the image decreasing operation is performed is two, as shown in FIGS. 9B, 9C, the number of images to be displayed on the screen is decreased from two to one. Also if it is determined in the flick direction determination (step S360) that the flick operation is the right flick operation, as shown in FIGS. 10A, 10B (or FIGS. 10B, 10C), the number of images to be displayed on the screen is decreased from four to two (or from two to one). As this occurs, the images which are displayed before the right flick operation is performed are hidden and images having indexes smaller than those of the images displayed before the right flick operation are displayed. Namely, the control unit 41 executes a preceding image display process in which an image preceding the image which is currently displayed is displayed. If the respective process in steps S365, S370 are completed, or it is determined in step S350 that the flick operation is neither the left flick operation nor the right flick operation, or if it is determined in step S360 that the operation performed on the touch panel input module 45 is not the flick operation, the flow of screen scrolling returns to the RAM clearing process (step S305).

Then, if it is determined in the downward shift determination (step S380) that the touched position is shifted downwards in the Y-coordinate, the flow of screen scrolling proceeds to a display divisions number increasing process (step S385). On the other hand, if it is determined that the touched position is not shifted downwards, then, the flow of screen scrolling proceeds to a flick determination (step S420).

If it is determined that the touched position is shifted downwards in the Y-coordinate, in the display divisions number increasing process (step S385), the control unit 41 changes the screen of the touch panel display module 44, for example, from a full single screen displaying one image into a screen divided into two equal parts each displaying two images or a halved screen while contracting the images. Following this, in a flick determination (step S390), it is determined whether or not an operation performed on the touch panel input module is a flick operation. If it is determined that the operation is the flick operation, then, in a flick direction determination (step S400), it is determined whether the flick operation is a left flick operation in which the flick operation is performed from the right to the left or a right flick operation in which the flick operation is performed from the left to the right. If it is determined that the flick operation is the left flick operation, as shown in FIGS. 7A, 7B, the number of images to be displayed on the screen is increased from one to two. As this occurs, the image which is displayed before the left flick operation is performed is hidden, and images are displayed which have indexes larger than that of the image which is displayed before the left flick operation. Namely, the control unit 41 executes a succeeding image display process in which an image which succeeds the image which is currently displayed on the touch panel display module 44 is displayed. In the event that the number of images displayed on the screen when the aforesaid operation is performed is two, as shown in FIGS. 7B, 7C, the number of images to be displayed on the screen is increased from two to four. Also, if it is determined in the flick direction determination (step S400) that the flick operation is the right flick operation, as shown in FIGS. 8A, 8B (or FIGS. 8B, 8C), the number of images to be displayed on the screen is increased from one to two (or from two to four). As this occurs, the image which is displayed before the right flick operation is performed is hidden, and images are displayed which have indexes smaller than that of the image displayed before the right flick operation. Namely, the control unit 41 executes a preceding image display process of displaying images which precede the image which is currently displayed on the touch panel display unit 44. If the respective process of steps S405, S410 are completed, or if it is determined in step S400 that the flick operation is neither the left flick operation nor the right flick operation, or if it is determined in step S390 that the operation performed on the touch panel input module 45 is not the flick operation, the flow of screen scrolling returns to the RAM clearing process (step S305).

In a flick determination (step S420), the control unit 41 determines whether or not the operation performed on the touch panel input module is a flick operation. Then, if it is determined that the operation is the flick operation, it is determined in a flick direction determination (step S430) whether the flick operation is a left flick operation in which the flick operation is performed from the right to the left or a right flick operation in which the flick operation is performed from the left to the right. If it is determined that the flick operation is the left flick operation, the image which is displayed before the left flick operation is performed is hidden and an image having an index which is next larger than that of the image displayed before the left flick operation is displayed. On the other hand, if it is determined that the flick operation is the right flick operation, the image which is displayed before the right flick operation is performed is hidden and an image having an index which is next smaller than that of the image displayed before the right flick operation is displayed.

Then, when the user performs a "tap operation" or a "flick operation" by touching the touch panel input module 45 to set the number of prints of an image which is selected by the series of operations, the number of prints is set according to the number of times of tapping.

Thus, according to the embodiment of the invention, in selecting a desired photographic image from a number of photographic images for printing, there can be provided the image display unit 1, the image display method and the image display program which enable the efficient and quick selection of the image by combining easily the screen scrolling in which images are scrolled one by one with the screen scrolling in which a plurality of images are scrolled at a time.

In addition, according to the embodiment of the invention, in selecting a desired photographic image from a number of photographic images for printing while displaying important images larger to verify it by expanding or contracting images so as to change the number of images to be displayed within the screen by the simple and easy operations, it is possible to select the desired image in an efficient and speedy fashion.

Further, according to the embodiment of the invention, images to be displayed on the touch panel display module 44 are contracted by the pinch-in operation to increase the number of divisions on the screen while the images are scrolled, whereby it is possible to select the desired photographic image while reducing the number of times of scrolling the screen.

Furthermore, according to the embodiment of the invention, images to be displayed on the touch panel display module 44 are expanded by the pinch-out operation to decrease the number of divisions on the screen while the images are scrolled, whereby it is possible to verify the images in detail by easily expanding the images during the selection.

Additionally, according to the embodiment of the invention, based on the shift in the Y-coordinate performed by the single touch, a single or a plurality of images which are to be displayed on the touch panel are contracted or expanded to change the number of images within the screen while the images are scrolled, whereby it is possible to select the desired photographic image in a simple fashion.

In addition, according to the embodiment of the invention, since the number of prints of the image displayed on the touch panel display module 44 can be set according to the number of times of touching or flicking the image, it is possible to set the number of prints of the image easily for printing.

Additionally, the various processes described in the embodiment can be written on a storage medium in the form of, for example, a magnetic disk, an optical disk or a semiconductor memory as an image display program which can be realized in a computer for application to various systems or can be transmitted to the various systems by a communication medium for application thereto. In this way, by executing the image printing program for executing the various processes described in this embodiment in other electronic equipment, the same function and advantage as those obtained when the image display unit 1 is used can be obtained. It should be noted that the computer is not limited to the computer incorporated in the image display unit 1 and hence includes every computer which is built in electronic equipment which includes an arithmetic operation unit such as a CPU that can read the image display program described above and which performs controlling operations according to the program so read.

While the several embodiments of the invention have been described heretofore, these embodiments are proposed as the examples, and hence, there is no intention to limit the scope of the invention by those embodiments. These novel embodiments can be carried out in other various forms, and it is possible to make various omissions, replacements or alterations thereto without departing from the spirit and scope of the invention. These resulting embodiments and their modifications are included in the spirit and scope of the invention and the scope of inventions which will be claimed later and their equivalents.

What is claimed is:

1. An image display unit comprising:
an input module having an operation screen which receives touch inputs;
a display module configured to display one or more images thereon;
a touched state detection module configured to detect whether or not the operation screen of the input module is touched for a touch input;
a touched position acquiring module configured to acquire a touched position on the input module which is touched for the touch input;
a flick detection module configured to detect whether or not a flick operation is performed based on a time variation of the touched position;
a flick direction detection module configured to detect a direction of the flick operation;
a display screen changing module configured to execute, based on the direction of the flick operation, one of (i) a first display screen changing process to hide a first one or more images displayed on the display module when the flick operation occurred and to display a second one or more images preceding or succeeding the first one or more images, with a number of images to be displayed on the display module being increased and sizes of the images to be displayed thereon being contracted, and (ii) a second display screen changing process to hide a first one or more images displayed on the display module when the flick operation occurred and to display a second one or more images preceding or succeeding the first one or more images with the number of images to be displayed on the display module being decreased and the sizes of the images to be displayed thereon being expanded;
a multi-touch detection module configured to detect whether or not two touch inputs are simultaneously made onto the operation screen of the input module;
an increased/decreased difference determination module configured to determine whether a differential value which is a difference in X-coordinates between touched positions of the two touch inputs increases or decreases when (i) the touched state detection module detects the touch input onto the operation screen of the input module, (ii) the multi-touch detection module detects that the two touch inputs are simultaneously made onto the operation screen of the input module, and (iii) one of the two touch inputs is the flick operation and a position of the other of the touch inputs is stationary; and
a pinch-in/pinch-out determination module configured to determine whether the two touch inputs are a pinch-in operation or a pinch-out operation based on directions of the two touch inputs when (i) the touched state detection module detects the touch input onto the operation screen of the input module, (ii) the multi-touch detection module detects that the two touch inputs are simultaneously made onto the operation screen of the input module, and (iii) both of the two touch inputs are the flick operation,
wherein:
in the event that both of the two touch inputs are the flick operation, the display screen changing module executes the first display screen changing process when the pinch-in/pinch-out determination module determines that the two touch inputs are the pinch-in operation, and the display screen changing module executes the second display screen changing process when the the pinch-in/pinch-out determination module determines that the two touch inputs are the pinch-out operation, and
in the event that one of the two touch inputs is the flick operation and a position of the other of the touch inputs is stationary: (i) when the differential value is decreased, the display screen changing module executes a third display screen changing process, based on the direction of the flick operation, to display a third one or more images preceding or succeeding the first one or more images with the number of images to be displayed on the display module being increased and the sizes of the images to be displayed thereon being contracted while continuing to display one of a frontmost image and an endmost image among the first one or more images, and (ii) when the differential value is increased, the display screen changing module executes a fourth display screen changing process, based on the direction of the flick operation, to display a fourth one or more images preceding or succeeding the first one or more images with the number of images to be displayed on the display module being decreased and the sizes of the images to be displayed thereon being expanded while continuing to display one of the frontmost image and the endmost image among the first one or more images.

2. The image display unit according to claim 1, further comprising:
a prints number control module configured to set a number of prints of an image displayed on the display module according to a number of times tapping or flicking is performed when the touched state detection module detects a touch onto the image displayed on the display module and one of a tap operation and a flick operation on the image.

3. An image display method for an image display unit comprising an input module having an operation screen which receives a touch input and a display module configured to display one or more images thereon, the image display method comprising:
detecting whether or not the operation screen of the input module is touched for a touch input;
acquiring a touched position on the input module which is touched for the touch input;
detecting whether or not a flick operation is performed at the touched position based on a time variation of the touched position;
detecting a direction in which the flick operation is performed;
executing, based on the direction in which the flick operation is performed, one of (i) a first display screen changing process to hide a first one or more images displayed on the display module when the flick operation occurred and to display a second one or more images preceding or succeeding the first one or more images with a number of images to be displayed on the display module being increased and sizes of the images to be displayed thereon being contracted, and (ii) a second display screen changing process to hide a first one or more images displayed on the display module when the flick operation occurred and to display a second one or more images preceding or succeeding the first one or more images with the number of images to be displayed on the display module being decreased and the sizes of the images to be displayed thereon being expanded;

detecting whether or not two touch inputs are simultaneously made onto the operation screen of the input module;

determining whether a differential value which is a difference in X-coordinates between touched positions of the two touch inputs increases or decreases when (i) the touch input onto the operation screen of the input module is detected, (ii) it is detected that the two touch inputs are simultaneously made onto the operation screen of the input module, and (iii) one of the two touch inputs is the flick operation and a position of the other of the touch inputs is stationary; and determining whether the two touch inputs are a pinch-in operation or a pinch-out operation based on directions of the two touch inputs when (i) the touched state detection module detects the touch input onto the operation screen of the input module, (ii) it is detected that the two touch inputs are simultaneously made onto the operation screen of the input module, and (iii) both of the two touch inputs are the flick operation, wherein:
in the event that both of the two touch inputs are the flick operation, the first display screen changing process is executed when it is determined that the two touch inputs are the pinch-in operation, and the second display screen changing process is executed when it is determined that the two touch inputs are the pinch-out operation, and in the event that one of the two touch inputs is the flick operation and a position of the other of the touch inputs is stationary: (i) when the differential value is decreased, a third display screen changing process is executed, based on the direction of the flick operation, to display a third one or more images preceding or succeeding the first one or more images with the number of images to be displayed on the display module being increased and the sizes of the images to be displayed thereon being contracted while continuing to display one of a frontmost image and an endmost image among the first one or more images, and (ii) when the differential value is increased, a fourth display screen changing process is executed, based on the direction of the flick operation, to display a fourth one or more images preceding or succeeding the first one or more images with the number of images to be displayed on the display module being decreased and the sizes of the images to be displayed thereon being expanded while continuing to display one of the frontmost image and the endmost image among the first one or more images.

4. A non-transitory computer readable storage medium storing an image display program for causing a computer to realize an image display method in an image display unit comprising an input module having an operation screen which receives a touch input and a display module configured to display one or more images thereon, the image display program being configured to cause the computer to perform functions comprising:

detecting whether or not the operation screen of the input module is being touched for a touch input;

acquiring a touched position on the input module which is touched for the touch input;

detecting whether or not a flick operation is performed at the touched position based on a time variation of the touched position;

detecting a direction in which the flick operation is performed;

executing, based on the direction of the flick operation, one of (i) a first display screen changing process to hide a first one or more images displayed on the display module when the flick operation occurred and to display a second one or more images preceding or succeeding the first one or more images with a number of images to be displayed on the display module being increased and sizes of the images to be displayed thereon being contracted, and (ii) a second display screen changing process to hide a first one or more images displayed on the display module when the flick operation occurred and to display a second one or more images preceding or succeeding the first one or more images with the number of images to be displayed on the display module being decreased and images to be displayed thereon being expanded;

detecting whether or not two touch inputs are simultaneously made onto the operation screen of the input module;

determining whether a differential value which is a difference in X-coordinates between touched positions of the two touch inputs increases or decreases when (i) the touch input onto the operation screen of the input module is detected, (ii) it is detected that the two touch inputs are simultaneously made onto the operation screen of the input module, and (iii) one of the two touch inputs is the flick operation and a position of the other of the touch inputs is stationary; and determining whether the two touch inputs are a pinch-in operation or a pinch-out operation based on directions of the two touch inputs when (i) the touched state detection module detects the touch input onto the operation screen of the input module, (ii) it is detected that the two touch inputs are simultaneously made onto the operation screen of the input module, and (iii) both of the two touch inputs are the flick operation, wherein:
in the event that both of the two touch inputs are the flick operation, the first display screen changing process is executed when it is determined that the two touch inputs are the pinch-in operation, and the second display screen changing process is executed when it is determined that the two touch inputs are the pinch-out operation, and in the event that one of the two touch inputs is the flick operation and a position of the other of the touch inputs is stationary: (i) when the differential value is decreased, a third display screen changing process is executed, based on the direction of the flick operation, to display a third one or more images preceding or succeeding the first one or more images with the number of images to be displayed on the display module being increased and the sizes of the images to be displayed thereon being contracted while continuing to display one of a frontmost image and an endmost image among the first one or more images, and (ii) when the differential value is increased, a fourth display screen changing process is executed, based on the direction of the flick operation, to display a fourth one or more images preceding or succeeding the first one or more images with the number of images to be displayed on the display module being decreased and the sizes of the images to be displayed thereon being expanded while continuing to display one of the frontmost image and the endmost image among the first one or more images.

5. An image display comprising:
an input module having an operation screen which receives touch inputs;
a display module configured to display one or more images thereon;
a touched state detection module configured to detect whether or not the operation screen of the input module is touched for a touch input;
a touched position acquiring module configured to acquire a touched position on the input module which is touched for the touch input;
a flick detection module configured to detect whether or not a flick operation is performed based on a time variation of the touched position;
a flick direction detection module configured to detect a direction of the flick operation;
a display screen changing module configured to execute, based on the direction of the flick operation, a display screen changing process to display a second one or more images preceding or succeeding a first one or more images displayed on the display module when the flick operation occurred, with a number of images to be displayed on the display module being changed and sizes of the images to be displayed thereon being changed;
a multi-touch detection module configured to detect whether or not two touch inputs are simultaneously made onto the operation screen of the input module; and
an increased/decreased difference determination module configured to determine whether a differential value which is a difference in X-coordinates between touched positions of the two touch inputs increases or decreases when the touched state detection module detects the touch input onto the operation screen of the input module and the multi-touch detection module detects that the two touch inputs are simultaneously made onto the operation screen of the input module,
wherein in the event that one of the two touch inputs is the flick operation and a position of the other of the touch inputs is stationary: (i) when the differential value is decreased, the display screen changing module executes a first display screen changing process, based on the direction of the flick operation, to display the second one or more images preceding or succeeding the first one or more images with the number of images to be displayed on the display module being increased and the sizes of the images to be displayed thereon being contracted while continuing to display one of a frontmost image and an endmost image among the first one or more images, and (ii) when the differential value is increased, the display screen changing module executes a second display screen changing process, based on the direction of the flick operation, to display the second one or more images preceding or succeeding the first one or more images with the number of images to be displayed on the display module being decreased and the sizes of the images to be displayed thereon being expanded while continuing to display one of the frontmost image and the endmost image among the first one or more images.

6. The image display unit according to claim 5, further comprising:
a pinch-in/pinch-out determination module configured to determine whether the two touch inputs are a pinch-in operation or a pinch-out operation based on directions of the two touch inputs when (i) the touched state detection module detects the touch input onto the operation screen of the input module, (ii) the multi-touch detection module detects that the two touch inputs are simultaneously made onto the operation screen of the input module, and (iii) both of the two touch inputs are the flick operation,
wherein the display screen changing module is configured to execute, in the event that both of the two touch inputs are the flick operation, (i) when the pinch-in/pinch-out determination module determines that the two touch inputs are the pinch-in operation, a third display screen changing process to hide the first one or more images displayed on the display module when the flick operations occurred and, based on the directions of the flick operations, to display a third one or more images preceding or succeeding the first one or more images, with a number of images to be displayed on the display module being increased and sizes of the images to be displayed thereon being contracted, and (ii) when the pinch-in/pinch-out determination module determines that the two touch inputs are the pinch-out operation, a fourth display screen changing process to hide the first one or more images displayed on the display module when the flick operations occurred and, based on the directions of the flick operations, to display a fourth one or more images preceding or succeeding the first one or more images with the number of images to be displayed on the display module being decreased and the sizes of the images to be displayed thereon being expanded.

7. An image display method for an image display unit comprising an input module having an operation screen which receives a touch input and a display module configured to display one or more images thereon, the image display method comprising:
detecting whether or not the operation screen of the input module is touched for a touch input;
acquiring a touched position on the input module which is touched for the touch input;
detecting whether or not a flick operation is performed based on a time variation of the touched position;
detecting a direction of the flick operation;
executing, based on the direction of the flick operation, a display screen changing process to display a second one or more images preceding or succeeding a first one or more images displayed on the display module when the flick operation occurred, with a number of images to be displayed on the display module being changed and sizes of the images to be displayed thereon being changed;
detecting whether or not two touch inputs are simultaneously made onto the operation screen of the input module; and
determining whether a differential value which is a difference in X-coordinates between touched positions of the two touch inputs increases or decreases when the touch input onto the operation screen of the input module is detected and that the two touch inputs are simultaneously made onto the operation screen of the input module is detected;
wherein in the event that one of the two touch inputs is the flick operation and a position of the other of the touch inputs is stationary, (i) when the differential value is decreased, a first display screen changing process is executed, based on the direction of the flick operation, to display the second one or more images preceding or succeeding the first one or more images with the number of images to be displayed on the display module being increased and the sizes of the images to be displayed thereon being contracted while continuing to display one of a frontmost image and an endmost image among the first one or more images, and (ii) when the differential value is increased, a second display screen changing process is executed, based on the direction of the flick operation, to display the second one or more images preceding or succeeding the first one or more images with the number of images to be displayed on the display module being decreased and the sizes of the images to be displayed thereon being expanded while continuing to display one of the frontmost image and the endmost image among the first one or more images.

8. A non-transitory computer readable storage medium storing an image display program for causing a computer to realize an image display method in an image display unit comprising an input module having an operation screen which receives a touch input and a display module configured to display one or more images thereon, the image display program being configured to cause the computer to perform functions comprising:

detecting whether or not the operation screen of the input module is touched for a touch input;
  acquiring a touched position on the input module which is touched for the touch input;
  detecting whether or not a flick operation is performed based on a time variation of the touched position;
  detecting a direction of the flick operation;
  executing, based on the direction of the flick operation, a display screen changing process to display a second one or more images preceding or succeeding a first one or more images displayed on the display module when the flick operation occurred, with a number of images to be displayed on the display module being changed and sizes of the images to be displayed thereon being changed;
  detecting whether or not two touch inputs are simultaneously made onto the operation screen of the input module; and
  determining whether a differential value which is a difference in X-coordinates between touched positions of the two touch inputs increases or decreases when the touch input onto the operation screen of the input module is detected and that the two touch inputs are simultaneously made onto the operation screen of the input module is detected;
  wherein in the event that one of the two touch inputs is the flick operation and a position of the other of the touch inputs is stationary, (i) when the differential value is decreased, a first display screen changing process is executed, based on the direction of the flick operation, to display the second one or more images preceding or succeeding the first one or more images with the number of images to be displayed on the display module being increased and the sizes of the images to be displayed thereon being contracted while continuing to display one of a frontmost image and an endmost image among the first one or more images, and (ii) when the differential value is increased, a second display screen changing process is executed, based on the direction of the flick operation, to display the second one or more images preceding or succeeding the first one or more images with the number of images to be displayed on the display module being decreased and the sizes of the images to be displayed thereon being expanded while continuing to display one of the frontmost image and the endmost image among the first one or more images.

\* \* \* \* \*